US012768677B2

(12) United States Patent
Kimura

(10) Patent No.: US 12,768,677 B2
(45) Date of Patent: Oct. 20, 2026

(54) OPTICAL ENCODER

(71) Applicant: Mitutoyo Corporation, Kawasaki (JP)

(72) Inventor: Akihide Kimura, Saitama (JP)

(73) Assignee: MITUTOYO CORPORATION, Kawasaki (JP)

( * ) Notice: Subject to any disclaimer, the term of this patent is extended or adjusted under 35 U.S.C. 154(b) by 428 days.

(21) Appl. No.: 18/474,331

(22) Filed: Sep. 26, 2023

(65) Prior Publication Data

US 2024/0110816 A1 Apr. 4, 2024

(30) Foreign Application Priority Data

Oct. 3, 2022 (JP) ................................ 2022-159599

(51) Int. Cl.
*G01D 5/347* (2006.01)

(52) U.S. Cl.
CPC ................................ *G01D 5/34746* (2013.01)

(58) Field of Classification Search
CPC ...... G01D 5/38; G01D 5/34746; G01D 5/347; G01D 5/266
See application file for complete search history.

(56) References Cited

U.S. PATENT DOCUMENTS 5,249,032 A 9/1993 Matsui et al.
8,735,801 B2 * 5/2014 Nagura .............. G01D 5/34784 250/231.13
10,077,991 B2 * 9/2018 Laman ..................... G01D 5/38
2005/0052729 A1 * 3/2005 Mitamura .......... G01D 5/34715 359/337.21
2016/0363464 A1 * 12/2016 Kato ........................ G01D 5/38
2018/0180453 A1 6/2018 Kimura et al.
2018/0299300 A1 10/2018 Kimura et al.
2019/0003860 A1 1/2019 Tobiason et al.
2020/0378803 A1 * 12/2020 Kimura ............. G01D 5/34715

FOREIGN PATENT DOCUMENTS

JP 4-184218 A 7/1992
JP 2018-105845 A 7/2018
JP 2019-012064 A 1/2019
JP 2019-219347 A 12/2019

* cited by examiner

*Primary Examiner* — Hwa Andrew Lee
(74) *Attorney, Agent, or Firm* — Rankin, Hill & Clark LLP

(57) ABSTRACT

An optical encoder optical encoder includes a scale and a detection head. The detection head includes a light source and light-receiving device with a light receiver surface. The light receiver surface has an element row with multiple light-receiving elements arranged along the measurement direction with the same period as that of the interference fringes. An error included in detection signals generated from the interference fringes, is referred to as a number-of-elements-induced error, and a predetermined allowable error is referred to as an allowable error. The number of light-receiving elements in the element row is set to be a number where the number-of-elements-induced error is smaller than the allowable error. The number-of-elements-induced error is caused when there is an odd total number of light-receiving elements and or when an odd number of light-receiving elements are functional.

16 Claims, 16 Drawing Sheets

OPTICAL ENCODER

CROSS-REFERENCE TO RELATED APPLICATION

This non-provisional application claims priority under 35 U.S.C. § 119(a) from Japanese Patent Application No. 2022-159599, filed on Oct. 3, 2022, the entire contents of which are incorporated herein by reference.

BACKGROUND OF THE INVENTION

Field of the Invention

The present invention relates to optical encoders.

Description of the Related Art

An optical encoder comprising: a scale with graduations; and a detection head provided, in a movable manner, relative to the scale, has conventionally been known. For example, the detection head of the optical encoder described in Japanese Patent Application No. 2019-012064 comprises: a light source that delivers light to the scale; and light-receiving means with a light-receiving surface that receives the light from the light source via the scale. The light-receiving means converts the light received at the light-receiving surface into detection signals that vary in a corresponding manner to the period of graduations in accordance with the relative movement between the scale and the detection head, and then outputs such detection signals, with the detection signals being differential signals of at least two phases with different phases.

The light-receiving surface has multiple light-receiving elements arranged along the measurement direction at the period corresponding to that of the graduations. In an optical encoder, the light delivered from the light source turns into multiple diffracted light rays via the graduations. The multiple diffracted light rays produce interference fringes with the same period as that of the graduations. The light-receiving means detects the detection signal by receiving such interference fringes, and the detection head detects the amount of relative movement between the scale and the detection head from the detection signal.

In such an optical encoder, if the ±1-order light rays that generate interference fringes are taken as a signal light, the other light rays are unwanted light. If the unwanted light lays are mixed into the interference fringes, disturbances occur in the interference fringes. For example, if the 0-order light ray is mixed in as unwanted light, disturbances occur in the intensity of the interference fringes that become the signal light. Disturbances in the intensity of interference fringes can cause errors in detecting the amount of relative movement between the scale and the detection head.

For this reason, as in the optical position detector (optical encoder) described in Japanese Patent Application No. 04-184218, an object for shielding unwanted light has conventionally been provided on the optical path of the light delivered from the light source and received at the light-receiving means via the scale, whereby the unwanted light is physically shielded. However, there is a problem with the method of Japanese Patent Application No. 04-184218 in that the space for providing the shielding object must be secured, and therefore the optical encoder increases in size. In addition, there also may be a problem in that the structure of the optical encoder becomes more complex since a mechanism for providing the shielding object is required.

On the other hand, in the encoders (optical encoders) described in Japanese Patent Application Nos. 2018-105845 and 2019-219347, the effects of the unwanted light are prevented without physically shielding the unwanted light. Specifically, the effects of the unwanted light can be canceled out by setting the number of light-receiving elements arranged along the measurement direction to be an even number. As such, the optical encoders can perform stable detection by preventing the effects of the unwanted light on the interference fringes and/or the disturbances in the intensity of the interference fringes from occurring, wherein the effects and/or disturbances lead to errors.

SUMMARY OF THE INVENTION

Problems to be Solved by the Invention

Incidentally, even if the number of light-receiving elements disposed is set to be an even number, there may be an odd number of functional light-receiving elements, and in effect the number of light-receiving elements disposed may become an odd number. Specifically, the light-receiving elements may become non-functional because of the malfunctioning of any of the light-receiving elements disposed or because of the occurrence of light-receiving elements that cannot detect light and/or detection signals due to contamination, or the like, of the scale, the light-receiving means, and/or the light-receiving elements.

The problems that arise when the number of light-receiving elements disposed is an odd number will now be described with reference to FIGS. 3 to 6.

FIG. 3 is a graph showing the detection signals when the ideal interference fringes including only ±1-order light rays are detected with 12 light-receiving elements. FIG. 4 is a graph showing the detection signals when the interference fringes including the 0-order light ray and the ±2-order light rays which are mixed in at intensities of 50% and 14%, respectively, when based on the ±1-order light rays, are detected with the 12 light-receiving elements. The 12 light-receiving elements are the number of light-receiving elements when three sets of four light-receiving elements are used, each light-receiving element detecting a corresponding phase, when four-phase signals are to be detected as detection signals. In FIGS. 3 and 4, the vertical axis shows the amplitude of the detection signal, and the horizontal axis shows the displacement of the scale. It is to be noted that FIG. 4 is a graph calculated and plotted using the initial conditions under which the largest disturbance in the interference fringes is found.

The light-receiving elements are arranged with the same period as that of the interference fringes. In addition, the light-receiving elements include: an A-phase element for detecting an A-phase signal; a B-phase element for detecting a B-phase signal; an AB-phase element for detecting an AB-phase signal, and a BB-phase element for detecting a BB-phase signal. Therefore, the light-receiving means can detect a four-phase signal.

As shown in FIG. 3, the interference fringes generated only by signal light without unwanted light being mixed therein are detected as a detection signal with a certain period and a certain amplitude. On the other hand, as shown in FIG. 4, the interference fringes generated by having the unwanted light mixed into the signal light have disturbances in the period and/or amplitude of the detection signal.

FIG. 5A is a graph showing the detection signals when the ideal interference fringes including only ±1-order light rays are detected with a single light-receiving element for detecting a corresponding phase, i.e., a total of four light-receiving elements, and FIG. 5B is a graph showing the amplitude of the error in FIG. 5A. FIG. 6A is a graph showing the detection signals when the interference fringes including the 0-order light ray and the ±2-order light rays which are mixed in at intensities of 50% and 14%, respectively, when based on the ±1-order light rays, are detected with a single light-receiving element for detecting a corresponding phase, i.e., a total of four light-receiving elements, as with FIG. 5A. FIG. 6B is a graph showing the amplitude of the error in FIG. 6A. In FIGS. 5A and 6A, the vertical axes show the amplitude of the differential A-phase and differential B-phase (the amplitude of the detection signal), and the horizontal axes show the displacement of the scale. Specifically, FIGS. 5B and 6B are graphs showing the frequency analysis of the detection signals shown in FIGS. 5A and 6A. In FIGS. 5B and 6B, the vertical axes show the amplitude of the errors, and the horizontal axes show the spatial frequency of the errors.

As shown in FIG. 5A, the interference fringes generated only by signal light without unwanted light being mixed therein are detected as a detection signal with a certain period and a certain amplitude. Then, as shown in FIG. 5B, the frequency analysis of the detection signal obtained in FIG. 5A shows that only the signal frequency component used for detection is present.

On the other hand, as shown in FIG. 6A, the interference fringes generated by having the unwanted light mixed into the signal light have disturbances in the period and/or amplitude of the detection signal. Then, as shown in FIG. 6B, the frequency analysis of the detection signals obtained in FIG. 6A shows that two signal frequency components are present, in addition to the signal frequency component used for detection. Specifically, an error component 1, which has a period twice the signal period of the signal light (i.e., ±1-order light rays), and an error component 2, which has a period 0.677 times the signal period of the signal light (i.e., ±1-order light rays), are present.

If the total number of the functional light-receiving elements is an even number in Japanese Patent Application Nos. 2018-105845 and 2019-219347, the encoder can obtain detection signals with no error components as shown in FIGS. 3, 5A, and 5B.

However, if the total number of the functional light-receiving elements is an odd number due to the above-described malfunctioning, contamination, or the like, in Japanese Patent Application Nos. 2018-105845 and 2019-219347, the encoder obtains detection signals with error components as shown in FIGS. 4, 6A, and 6B. Accordingly, if the total number of functional light-receiving elements becomes an odd number even when the total number of the light-receiving elements is an even number, a problem arises in that the occurrence of errors cannot be prevented and detection signals cannot be obtained in a stable manner since the advantageous effect of canceling out the cause of the errors due to unwanted light is reduced.

An object of the present invention is to provide an optical encoder that can reduce the effects of unwanted light in a stable manner.

Means for Solving the Problems

The optical encoder of the present invention comprises: a plate-shaped scale having graduations formed along a measurement direction with a predetermined period, the graduations functioning as a diffraction grating for diffracting incident light; and a detection head provided, in a movable manner, relative to the scale along the measurement direction. The detection head includes: a light source that delivers light to the scale; and light-receiving means with a light-receiving surface for receiving light from the light source via the scale. The light that has passed through the scale forms, on the light-receiving surface, interference fringes that vary in a corresponding manner to the period of the graduations in accordance with the relative movement between the scale and the detection head. The light-receiving surface has an element row with multiple light-receiving elements arranged along the measurement direction with the same period as that of the interference fringes.

Here, an error included in the detection signals generated from the interference fringes obtained from the received light, with such error being caused by the fact that the number of light-receiving elements is an odd number, will be referred to as a number-of-elements-induced error, and a predetermined allowable error will be referred to as an allowable error. Specifically, the allowable error refers to an error that is allowable in terms of the performance of the optical encoder, and the optical encoder is designed such that the number-of-elements-induced error does not exceed the allowable error, with the allowable error being set as the target value.

The number of light-receiving elements in the element row is set to be a number where the number-of-elements-induced error is smaller than the allowable error. Such number-of-elements-induced error is caused when there is an odd total number of light-receiving elements and such odd total number of light-receiving elements are functional, or when there is an even total number of light-receiving elements but one less than such even total number of light-receiving elements are functional.

According to such invention, under the above-described conditions, the optical encoder can reduce the error, even if the number of functional light-receiving elements is an odd number, by arranging the light-receiving elements in a number where the number-of-elements-induced error is smaller than the allowable error. Accordingly, the optical encoder can reduce the effect of the unwanted light in a stable manner, even if the total number of functional light-receiving elements becomes an odd number due to malfunctioning, contamination, or the like.

In this case, the scale diffracts and divides the light delivered from the light source into at least a 0-order light ray, ±1-order light rays, and ±2-order light rays. The optical encoder takes the ±1-order light rays as signal light and the other light rays as unwanted light that causes the number-of-elements-induced error, and uses the interference fringes formed by the ±1-order light rays for detection, and the optical encoder is configured, regarding intensity of unwanted light with respect to intensities of the ±1-order light rays delivered to the light-receiving means, such that an intensity of the 0-order light ray is 50% or less, and intensities of the ±2-order light rays are 14% or less. When the allowable error is set to be 0.1%, the number of light-receiving elements in the element row is preferably set to be 1,082 or more, which is a number where the number-of-elements-induced error is 0.1% or less.

According to such configuration, in a predetermined configuration where interference fringes formed by the ±1-order light rays are used for detection, the optical encoder can reduce the effect of unwanted light in a stable manner, even if the total number of functional light-receiving elements becomes an odd number due to malfunctioning, contamination, or the like.

In this case, the light-receiving means converts the interference fringes received at the light-receiving surface into detection signals that vary in a corresponding manner to the period of the graduations in accordance with the relative movement between the scale and the detection head, and then outputs such detection signals, with the detection signals being differential signals of at least two phases with different phases. Preferably, the light-receiving surface includes a group of element rows where at least two element rows are arranged along a direction orthogonal to the measurement direction.

According to such configuration, the optical encoder can prevent errors that may occur due to contamination, even if any of the light-receiving elements is contaminated.

In this case, the light-receiving means converts the interference fringes received at the light-receiving surface into detection signals that vary in a corresponding manner to the period of the graduations in accordance with the relative movement between the scale and the detection head, and then outputs such detection signals, with the detection signals being differential signals of two phases with different phases. The light-receiving surface includes an element row with multiple light-receiving elements arranged along the measurement direction with a period corresponding to that of the graduations, and an element row group where four such element rows are arranged together along a direction orthogonal to the measurement direction. The element rows include, regarding each of the two phases, positive-phase signal element rows that output positive-phase signals and negative-phase signal element rows that output negative-phase signals. These two phases are staggered along the measurement direction with a predetermined phase difference. Multiple element row groups are arranged along the orthogonal direction in the light-receiving surface. Here, the positive-phase signals of the two phases will be referred to as a first signal and a second signal, the negative-phase signal of the first signal will be referred to as a third signal, and the negative-phase signal of the second signal will be referred to as a fourth signal. The element rows in the element row group are preferably arranged along the direction orthogonal to the measurement direction in the order of: the positive-phase signal element row that outputs the first signal; the positive-phase signal element row that outputs the second signal; the negative-phase signal element row that outputs the third signal, and the negative-phase signal element row that outputs the fourth signal.

According to such configuration, the optical encoder can obtain four-phase signals as detection signals while preventing the errors that may occur due to contamination.

Alternatively, the light-receiving means converts the interference fringes received at the light-receiving surface into detection signals that vary in a corresponding manner to the period of the graduations in accordance with the relative movement between the scale and the detection head, and then outputs such detection signals, with the detection signals being differential signals of at least two phases with different phases. The light-receiving surface includes an element row with multiple light-receiving elements arranged along the measurement direction with a period corresponding to that of the graduations, and an element row group where at least four such element rows are arranged together along a direction orthogonal to the measurement direction. The element rows include, regarding each of at least two phases, a positive-phase signal element row that outputs a positive-phase signal, which is one of the detections signals, and a negative-phase signal element row that outputs a negative-phase signal, which is one of the detection signals. The least two phases are staggered along the measurement direction with a predetermined phase difference. Preferably, the element rows in the element row group are arranged at positions where the sum of the distance in the orthogonal direction from a reference position to the positive-phase signal element row and the distance in the orthogonal direction from the reference position to the negative-phase signal element row, is equal for all phases of the at least two phases. The reference position refers to a predetermined position on the receiving surface.

Here, preferably, the surface on which the graduations are arranged of the scale 2 is parallel to the light-receiving surface. However, a shift may occur in the phase difference of the differential signals if the surface on which the graduations are arranged (hereinafter, simply referred to as the "scale") of the scale is arranged, with respect to the light-receiving surface, with a rotation and a tilt around a rotation axis, with the axis being orthogonal to the light-receiving surface, in the process of manufacturing and/or use. There is a problem that this shift in the phase difference may cause a deterioration in the accuracy of the optical encoder.

However, according to such configuration, it is possible to cancel out the shift in the phase difference of the differential signals, which is caused by the scale being arranged, with respect to the light-receiving surface, with a rotation and a tilt around a rotation axis, with the axis being orthogonal to the light-receiving surface. This is achieved by arranging the element rows in the element row group at positions where the sum of the distance in the orthogonal direction from a reference position to the positive-phase signal element row and the distance in the orthogonal direction from the reference position to the negative-phase signal element row, is equal for all phases of the at least two phases. Therefore, the optical encoder can prevent the deterioration in the accuracy even if the scale is arranged, with respect to the light-receiving surface, with a rotation and a tilt around a rotation axis, with the axis being orthogonal to the light-receiving surface.

In this case, preferably, the element row group includes a first element row group and a second element row group that is arranged adjacent to the first element row group in the orthogonal direction in the light-receiving surface, with the second element row group including element rows in a different arrangement from that of the element rows in the first element row group. Then, the positive-phase signal element rows in the first element row group preferably account for half of the element rows in the first element row group, and are arranged on one side with respect to the center of the orthogonal direction in the first element row group, with the positive-phase signal element rows being arranged in an order that serves as a predetermined reference from one end side of the orthogonal direction toward the center in the first element row group. Here, "the order that serves as a predetermined reference" may refer to the order of the A-phase and then the B-phase, if, for example, the two phases consist of two phases of the A-phase and the B-phase. Preferably, the negative-phase signal element rows in the first element row group account for half of the element rows in the first element row group, and are arranged on the other side with respect to the center of the orthogonal direction in the first element row group, with the negative-phase signal element rows being arranged in an order that serves as a predetermined reference from the other end side of the orthogonal direction toward the center in the first element row group. In addition, the positive-phase signal element rows in the second element row group preferably account for half of the element rows in the second element row group, and are arranged on one side with respect to the center of the orthogonal direction in the second element row group, with the positive-phase signal element rows being arranged in an order reverse to the order that serves as a predetermined reference (in the above-described base, in the order of the B-phase and then the A-phase) from one end side of the orthogonal direction toward the center in the second element row group.

Preferably, the negative-phase signal element rows in the second element row group account for half of the element rows in the second element row group, and are arranged on the other side with respect to the center of the orthogonal direction in the second element row group, with the negative-phase signal element rows being arranged in an order reverse to the order that serves as a predetermined reference from the other end side of the orthogonal direction toward the center in the second element row group.

According to the above-described configuration, it is possible to efficiently cancel out the shift in the phase difference of the differential signals, which is caused by the scale being arranged, with respect to the light-receiving means, with a rotation and a tilt around a rotation axis, with the axis being orthogonal to the light-receiving surface, while preventing the amplitude of the differential signals from becoming small, with the differential signals being based on the detection signals from the light-receiving means. This may be contrasted with the case where the first element row group and the second element row group are not provided.

Alternatively, the light-receiving means comprises a photodiode with an area larger than the total area of the total number of light-receiving elements, and a pattern-forming layer arranged on the light-receiving surface of the photodiode, with the pattern-forming layer including a transmissive part that transmits light therethrough and a non-transmissive part that blocks the light. Preferably, a plurality of such transmissive parts is formed along the measurement direction with the same period as that of the interference fringes, and they function as light-receiving elements.

Here, there are cases where ready-made light-receiving elements cannot be employed in the optical encoder due to the IC design rules, more specifically, due to arrangement and/or size of the substrates, and/or the size of the element being too large, or the like.

However, according to the above-described configuration, pseudo-fine light-receiving elements can be formed by forming the transmissive parts in a fine manner. Therefore, light-receiving elements can be freely designed without being restricted by the IC design rules.

In this case, the detection head includes an optical element that concentrates light diffracted and divided by the scale onto the light-receiving surface. This optical element is preferably disposed between the scale and the light-receiving means.

According to such configuration, since the diffracted light rays diverging from the scale can be efficiently collected onto the light-receiving surface, the diffracted light rays required for the signal can be efficiently collected and more optical power (amount of light) can be obtained compared to the case where the optical element is not used.

In this case, the optical element is preferably a diffraction grating plate which has a plate surface parallel to the surface of the scale on which the graduations are arranged, and has a grating on the plate surface along a predetermined direction.

According to such configuration, by employing a diffraction grating plate for the optical element, a configuration where diffracted light rays diverging from the scale can be efficiently collected onto the light-receiving surface, can be easily achieved.

DETAILED DESCRIPTION OF THE EMBODIMENTS

First Embodiment

The first embodiment of the present invention will now be described below with reference to FIGS. 1 to 8.

Figure 1:
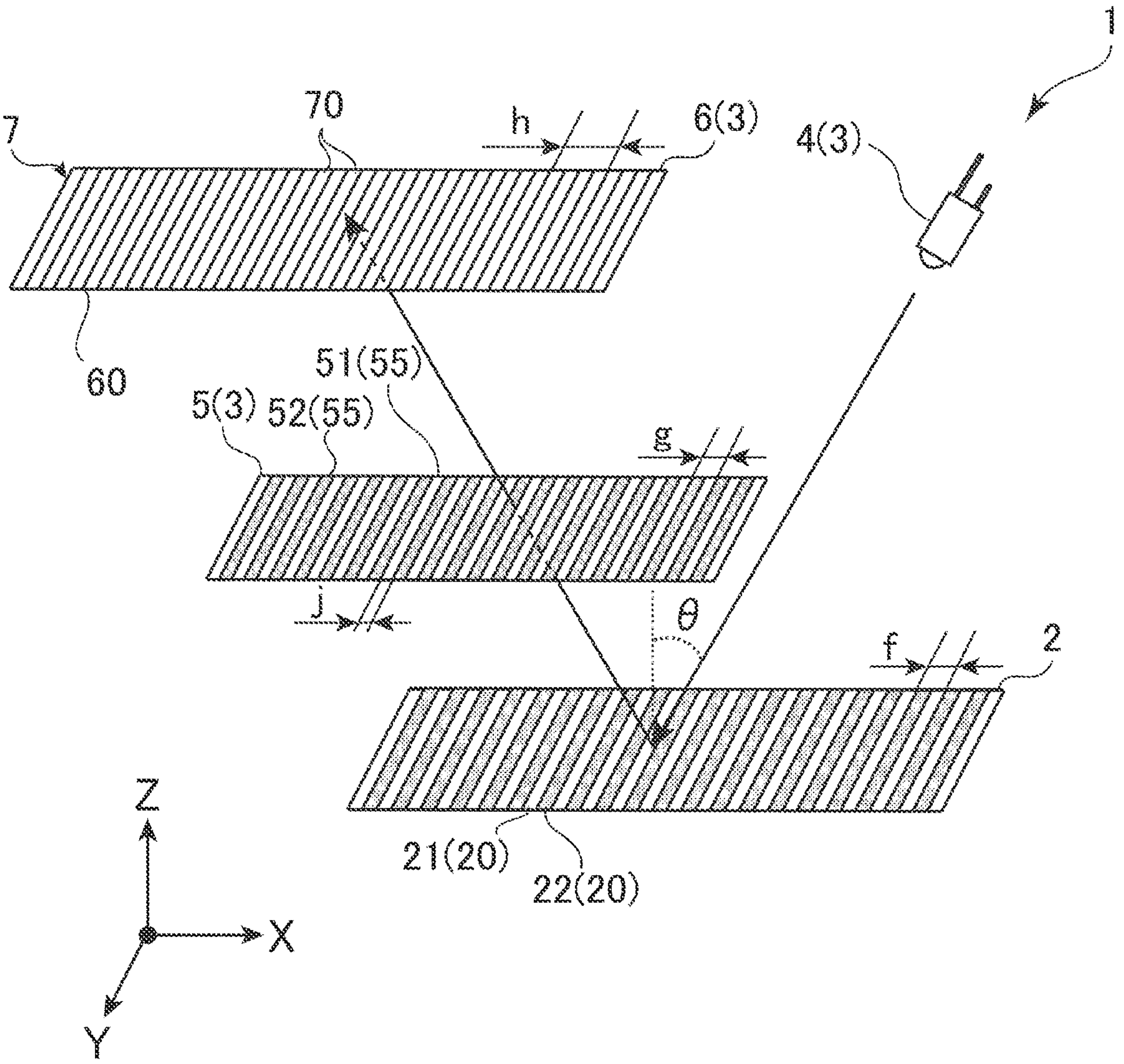
FIG. 1 is a perspective view showing an optical encoder according to the respective embodiments.
Figure 2:
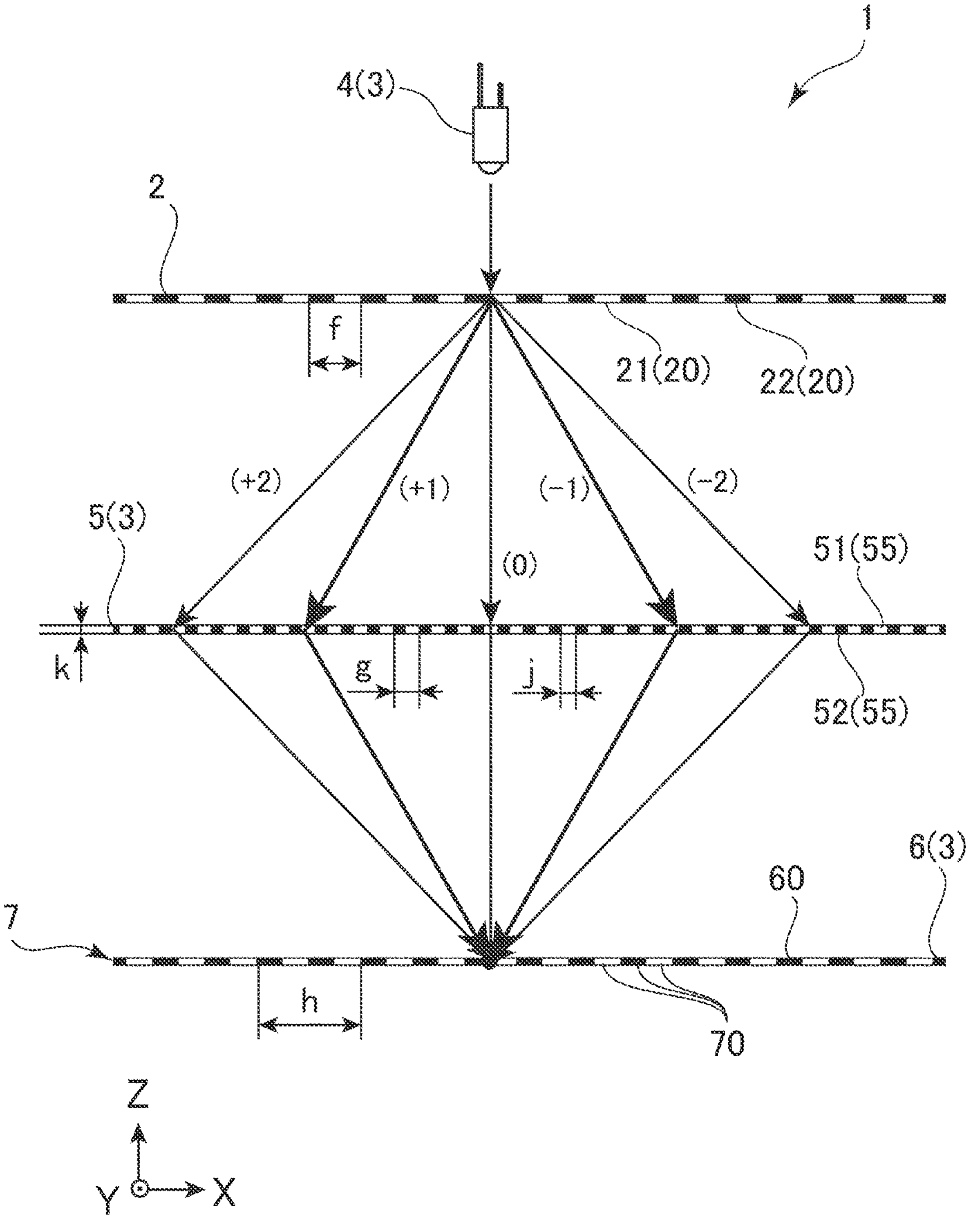
FIG. 2 is a schematic diagram showing the optical encoder according to the respective embodiments.

FIG. 1 is a perspective view showing an optical encoder 1 according to the first embodiment. FIG. 2 is a schematic diagram showing the optical encoder 1 according to the first embodiment. Since the scale 2 of the optical encoder 1, which will be described later, is of a reflective type, FIG. 1 shows a reflective-type optical encoder 1; however, FIG. 2 shows a transmissive-type optical encoder 1, where the light reflected at the scale 2 is folded back, in order to clarify the optical path of the light from the light source 4.

As shown in FIG. 1, the optical encoder 1 is a linear encoder comprising: a plate-shaped scale 2 formed along the X-direction, which is the measurement direction; and a detection head 3 provided, in a movable manner, relative to the scale 2 along the X-direction. In the following descriptions and the respective drawings, the measurement direction, i.e., the lengthwise direction, of the scale 2 will be set forth as the X-direction (X-axis), the widthwise direction of the scale 2 will be set forth as the Y-direction (Y-axis), and the height direction perpendicular to the X- and Y-directions will be set forth as the Z direction (Z-axis perpendicular to the X- and Y-axes).

The detection head 3 comprises: a light source 4; an optical element 5; and light-receiving means 6 with a light-receiving surface 60, and is provided such that it can move forward or backward in the X-direction relative to the scale 2. A linear encoder obtains positional information from the amount of relative movement between the scale 2 and the detection head 3 by moving the detection head 3 along the scale 2.

First, the scale 2 will be described.

The scale 2 is made of glass, or the like, and is formed in a plate shape. On one side of the scale 2, graduations 20 are provided, which are formed with a predetermined period g along the X-direction. The graduations 20 comprise a reflective part 21 that reflects light from the light source 4 and a non-reflective part 22 that absorbs, or the like, light without reflecting the light. The reflective part 21 is a metal plate that is formed thin and processed to reflect light. The non-reflective part 22 is applied with an anti-reflective agent that absorbs light so that it does not reflect light. The reflective part 21 and the non-reflective part 22 have an equal width and are arranged at equal intervals. The reflective part 21 may not need to be a metal plate, as long as it can reflect light. For example, the reflective part 21 may be a mirror, or the like. The non-reflective part 22 may not need to be applied with an anti-reflective member, as long as it does not reflect light, and it may have any configuration.

The graduations 20 function as a diffraction grating for diffracting incident light, and the light delivered from the light source 4 is diffracted and divided into at least the 0-order light ray, the ±1-order light rays, and the ±2-order light rays. The light that has passed through the graduations 20 forms, on the light-receiving surface 60, interference fringes that vary in a corresponding manner to the period g of the graduations 20 in accordance with the relative movement between the scale 2 and the detection head 3. The optical encoder 1 takes the ±1-order light rays as signal light and the other light rays as unwanted light, and the interference fringes formed by the ±1-order light rays are used for detection.

Next, the light source 4, the optical element 5, and the light-receiving means 6 of the detection head 3 will be described.

The light source 4 delivers parallel light to one side of the scale 2. A light emitting diode (LED) is used for the light source 4. However, the light source 4 is not limited to LEDs and any light source may be employed, as long as it can cause interference fringes to be generated on the light-receiving means 6. Examples may include a semiconductor laser, a helium neon laser, and the like. In FIG. 1, the optical path of the light delivered from the light source 4 is set forth with an arrow.

The optical element 5 is disposed between the scale 2 and the light-receiving means 6 in order to direct the light diffracted and divided by the scale 2 onto the light-receiving surface 60 of the light-receiving means 6.

The optical element 5 has a plate surface 50 parallel to the surface of the scale 2 on which the graduations 20 are arranged, and has a grating 55 on the plate surface 50 along the X-direction, which is a predetermined direction. The grating 55 has a convex part 51 and a recess part 52. The convex part 51 and the recess part 52 are formed in an alternating manner and are arranged with a predetermined period g along the X-direction, which is the measurement direction. The optical element 5 is a transmissive-type diffraction grating plate formed by a plate material made of synthetic quartz. The optical element 5 may not need to be formed by a plate material made of synthetic quartz, and any optical element may be employed, as long as it is a transparent plate material.

The light-receiving means 6 is disposed parallel to the XY-plane surface, which is the plate surface of the scale 2. The light-receiving means 6 has the light-receiving surface 60 that receives light from the light source 4 through the scale 2.

The light-receiving means 6 receives the light that has passed through the scale 2 and detects a detection signal from the interference fringes generated by such light. In the present embodiment, the interference fringes are generated on the light-receiving surface 60 along the Y-direction, which is the widthwise direction of the scale 2. A photo diode array (PDA) is used for the light-receiving means 6. A PDA is a detector with the ability to measure multiple interference fringes at once. The light-receiving means 6 is not limited to PDAs and any detector may be used, such as a charge-coupled device (CCD), or the like.

The light-receiving means 6 converts the interference fringes received at the light-receiving surface 60 into detection signals that vary in a corresponding manner to the period of the graduations 20 in accordance with the relative movement between the scale 2 and the detection head 3, and then outputs such detection signals, with the detection signals being differential signals of at least two phases with different phases. The detection signals includes detection signals of two phases (i.e., A-phase and B-phase) which are different. The detection signals of both phases are differential signals. In the present embodiment, the detection signals include: an A-phase signal, which is the positive phase signal of the A-phase; an AB-phase signal, which is the negative-phase signal of the A-phase; a B-phase signal, which is the positive phase signal of the B-phase; and a BB-phase signal, which is the negative-phase signal of the B-phase.

The light-receiving surface 60 has an element row 7 with multiple light-receiving elements 70 arranged along the X-direction, which is the measurement direction, with the same period as that of the interference fringes.

Figure 3:
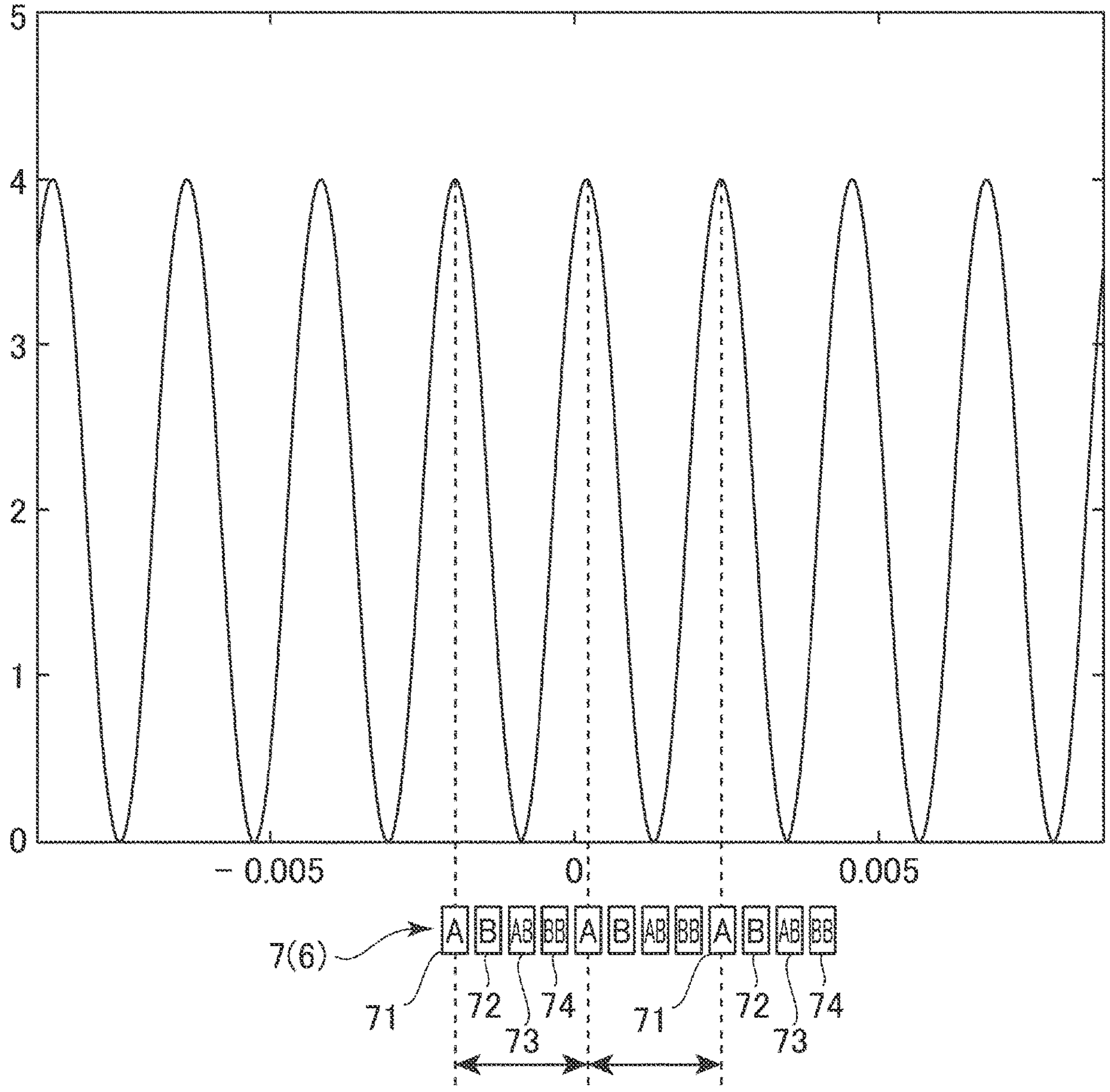
FIG. 3 is a graph showing the detection signals when the ideal interference fringes including only ±1-order light rays are detected with 12 light-receiving elements.

As shown in FIG. 3 described below, the multiple light-receiving elements 70 in the element row 7 include an element 71 for detecting the A-phase signal, an element 72 for detecting the B-phase signal, an element 73 for detecting the AB-phase signal, and an element 74 for detecting the BB-phase signal.

As shown in FIG. 3, in the multiple light-receiving elements 70, the elements 71 to 74 are repeatedly arranged such that the elements are in the order of the element 71 for detecting the A-phase signal, the element 72 for detecting the B-phase signal, the element 73 for detecting the AB-phase signal, and the element 74 for detecting the BB-phase signal, along the X-direction, which is the measurement direction.

Here, an error included in the detection signals generated from the interference fringes obtained from the received light, with such error being caused by the fact that the number of light-receiving elements 70 is an odd number, will be referred to as a number-of-elements-induced error, and a predetermined allowable error will be referred to as an allowable error. Specifically, the allowable error refers to an error that is allowable in terms of the performance of the optical encoder 1, and the optical encoder 1 is designed such that the number-of-elements-induced error does not exceed the allowable error, with the allowable error being set as the target value.

In contrast to the signal light (i.e., ±1-order light rays) that forms the interference fringes, which is converted to the detection signals, the unwanted light, such as the 0-order light ray and/or the ±2-order light rays, causes the number-of-elements-induced error. The optical encoder 1 seeks to prevent the number-of-elements-induced errors by adjusting the number of light-receiving elements 70 in the element row 7.

Specifically, the number of light-receiving elements 70 in the element row 7 is set to be a number such that the number-of-elements-induced error is smaller than the allowable error. Such the number-of-elements-induced error is caused when there is an odd total number of light-receiving elements 70 and such odd total number of light-receiving elements 70 are functional, or when there is an even total number of light-receiving elements 70 but one less than such even total number of light-receiving elements are functional. In doing so, regarding the intensity of the unwanted light with respect to the intensity of the signal light (i.e., ±1-order light rays) delivered to the light-receiving means 6, the optical encoder 1 is configured such that the intensity of the 0-order light ray is 50% or less, and the intensities of the ±2-order light rays are 14% or less. When the allowable error is set to be 0.1%, the number of light-receiving elements 70 in the element row 7 is preferably set to be 1,082 or more, which is the number where the number-of-elements-induced error will be 0.1% or less.

The following describes the configuration of the optical encoder 1 for setting the number-of-elements-induced error to be 0.1% or less, and how to set the total number of light-receiving elements 70 in the element row 7 to be 1,082 or more.

In the optical encoder 1 shown in FIGS. 1 and 2, the light source 4 has a light wavelength of 660 nm and is disposed such that the angle of incidence θ of the light to the graduations 20 of the scale 2 is 30 degrees (see FIG. 1). Assume that the period f of the graduations 20 of the scale 2 (see FIGS. 1 and 2) is 2 μm, the period g of the grating 55 of the optical element 5 is 1.375 μm (see FIGS. 1 and 2), and the period h of the light-receiving elements 70 in the element row 7 of the light-receiving means 6 is 2.2 μm (see FIGS. 1 and 2).

In such optical encoder 1, the resultant diffracted light diffracted by the scale 2 includes only the 0-order light ray, the ±1-order light rays, and the ±2-order light rays, and no ±3-order or higher diffracted light rays are present.

At this time, the signal light (i.e., ±1-order light rays) is obtained at 10% and the unwanted light (i.e., 0-order light ray) is obtained at 25%. Theoretically, the unwanted light of the ±2-order light rays does not occur; however, it does occur, based on the theoretical values, with a diffraction efficiency of about 7% when manufacturing errors are taken into consideration. When the convex part 51 has a width j in the X-direction along the measurement direction of 0.34 μm and the recess part 52 has a groove depth k of 0.85 μm with respect to the period of 1.375 μm of the grating 55 of the optical element 5, the signal light (i.e., ±1-order light rays) is obtained at 60% or more, the unwanted light of the 0-order light ray is 12% or less, and the unwanted light of the ±2-order light rays is 12% or less.

In this case, the amount of light reaching the light-receiving elements 70 in the element row 7 can be determined with the following Equations (1) to (3) by multiplying the diffraction efficiency of the scale 2 by the diffraction efficiency of the optical element 5:

$$\text{0-order light ray}=25\%\times12\%=0.25\times0.12=0.03 \tag{1}$$

$$\pm\text{1-order light rays}=10\%\times60\%=0.1\times0.6=0.06 \tag{2}$$

$$\pm\text{2-order light rays}=7\%\times12\%=0.07\times0.12=0.0084 \tag{3}$$

Based on the ±1-order light rays, the 0-order light ray reaches the light-receiving elements 70 in the element row 7 with the amount of light of 50% according to Equation (4), and the ±2-order light rays reach the light-receiving elements 70 in the element row 7 with the amount of light of 14% according to Equation (5).

$$\text{0-order light ray}/\pm\text{1-order light rays}=0.03/0.06=0.5=50\% \tag{4}$$

$$\pm\text{2-order light rays}/\pm\text{1-order light rays}=0.0084/0.06=0.14=14\% \tag{5}$$

The above calculation equations assume that all the unwanted light generated is injected into the light-receiving surface (the area of the light-receiving surface where the light can be received) of the light-receiving means. Here, depending on the mechanical design of the optical encoder (detector), part of the unwanted light may be shielded before it reaches the light-receiving means (light-receiving surface), and only part of the generated unwanted light may be injected into the light-receiving surface. For example, part of the unwanted light may be shielded due to the disposed or held components that are not intended for shielding the unwanted light, the design of the optical encoder, and/or the like. In such case, because only part of the unwanted light is delivered to the light-receiving means (light-receiving surface), the ratio of the unwanted light to the signal light becomes small, and thus the optical encoder of the present invention can achieve even higher advantageous effects.

Next, an example calculation of the interference fringes will be described using figures.

Figure 4:
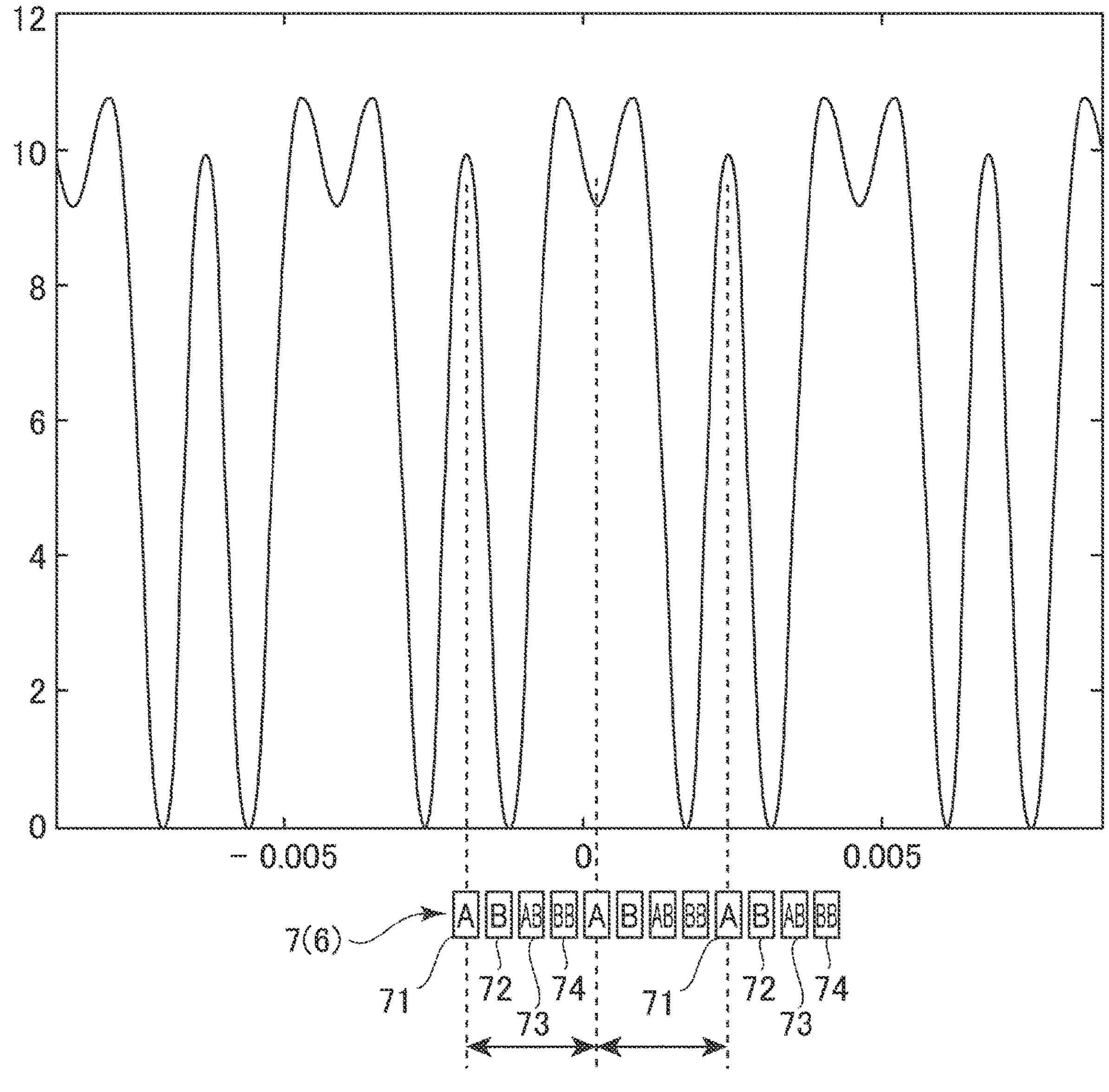
FIG. 4 is a graph showing the detection signals when the interference fringes including the 0-order light ray and the ±2-order light rays which are mixed in at intensities of 50% and 14%, respectively, when based on the ±1-order light rays, are detected with the 12 light-receiving elements.

FIG. 3 is a graph showing the detection signals when the ideal interference fringes including only ±1-order light rays are detected with 12 light-receiving elements, and FIG. 4 is a graph showing the detection signals when the interference fringes including the 0-order light ray and the ±2-order light rays which are mixed in at intensities of 50% and 14%, respectively, when based on the ±1-order light rays, are detected with the 12 light-receiving elements. The vertical and horizontal axes in FIGS. 3 and 4 are as described above. The detection signals detected by the light-receiving elements 70 in the element row 7 are detection signals of four phases, i.e., the A-phase, the B-phase, the AB-phase, and the BB-phase, as described above. The disturbances in the interference fringes also depend on the initial phase relationships between the respective diffracted light rays. FIGS. 3 and 4 show the case where the light-receiving elements 70 in the element row 7 are arranged with the same period as that of the interference fringes using the initial condition under which the largest disturbance in the interference fringe is found.

Figure 5A:
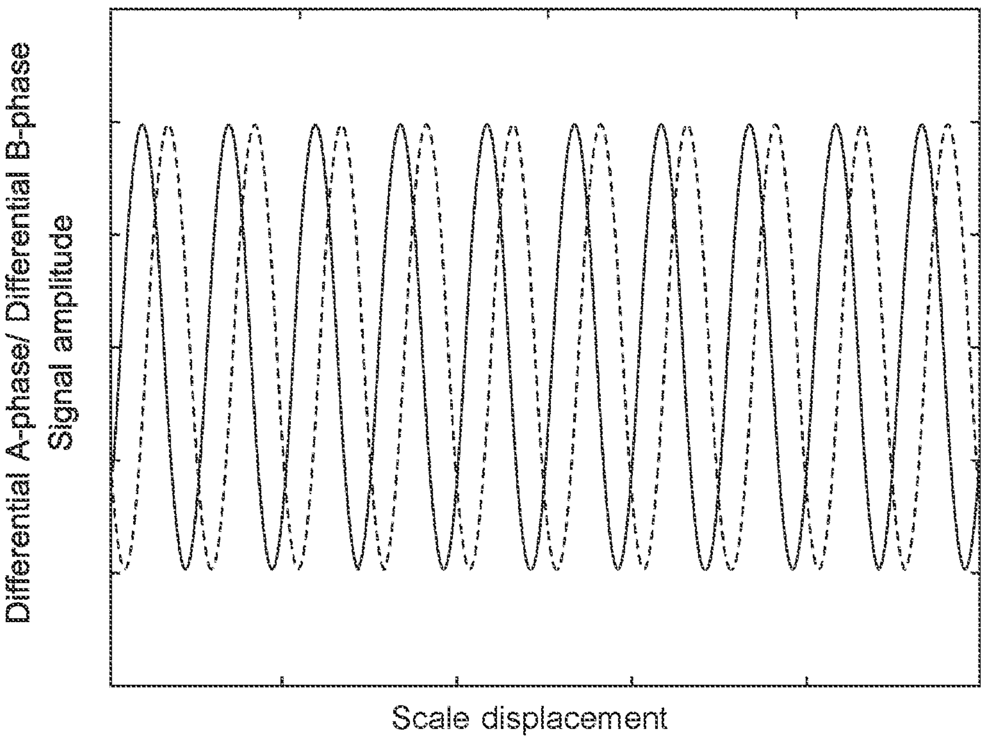
FIG. 5A is a graph showing the detection signals when the ideal interference fringes including only ±1-order light rays are detected with four light-receiving elements.
Figure 5B:
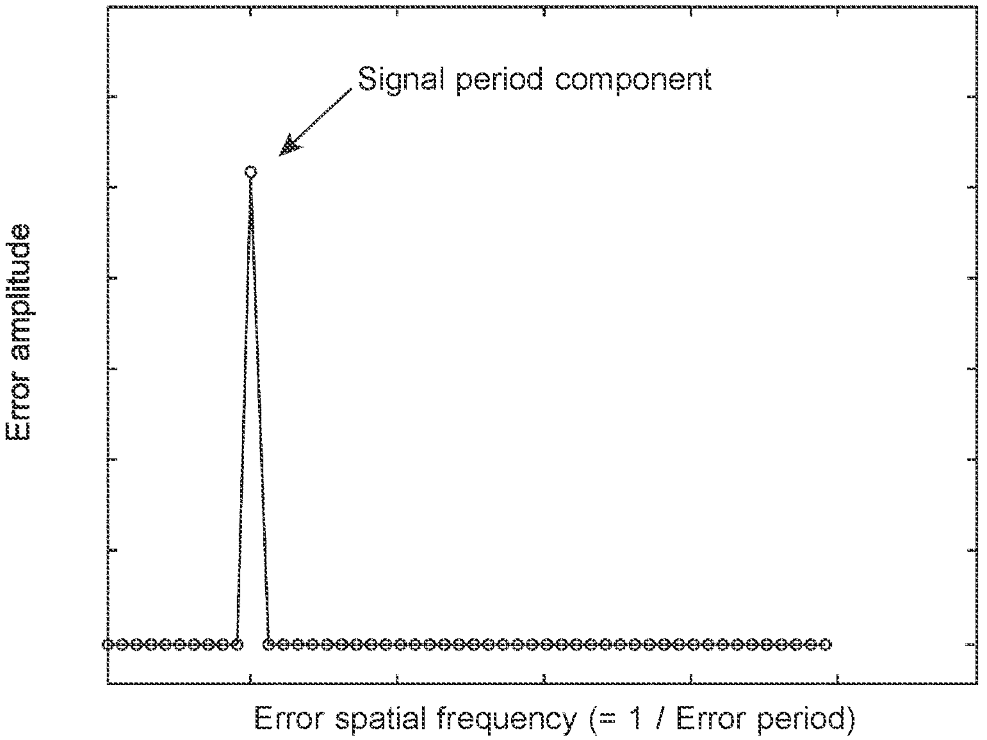
FIG. 5B is a graph showing the amplitude of the error in FIG. 5A.
Figure 6A:
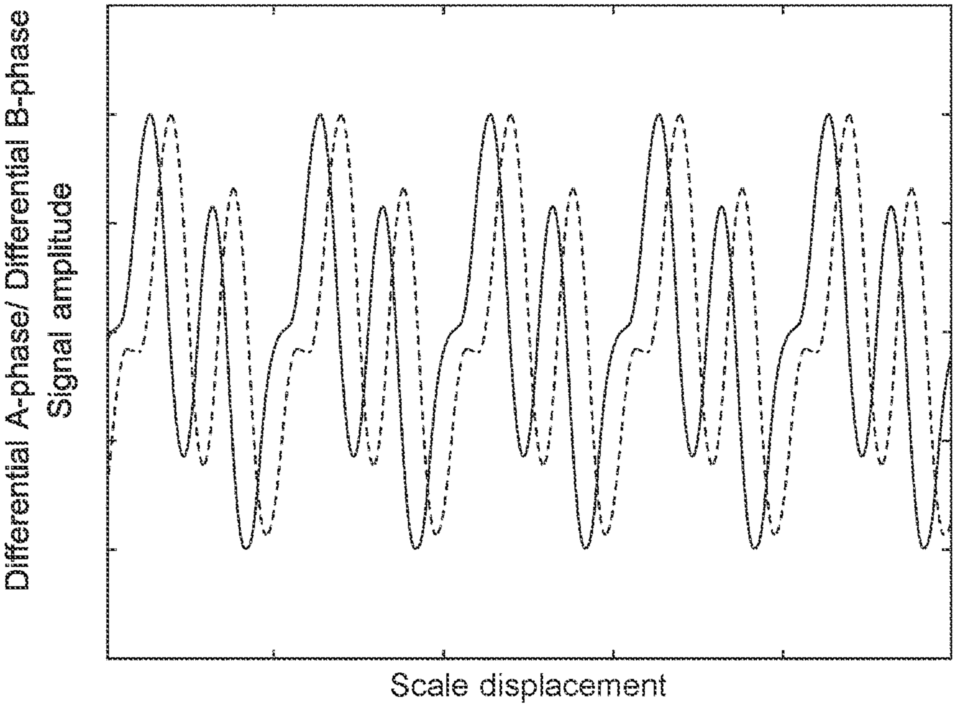
FIG. 6A is a graph showing the detection signals when the interference fringes including the 0-order light ray and the ±2-order light rays which are mixed in at intensities of 50% and 14%, respectively, when based on the ±1-order light rays, are detected with the four light-receiving elements.
Figure 6B:
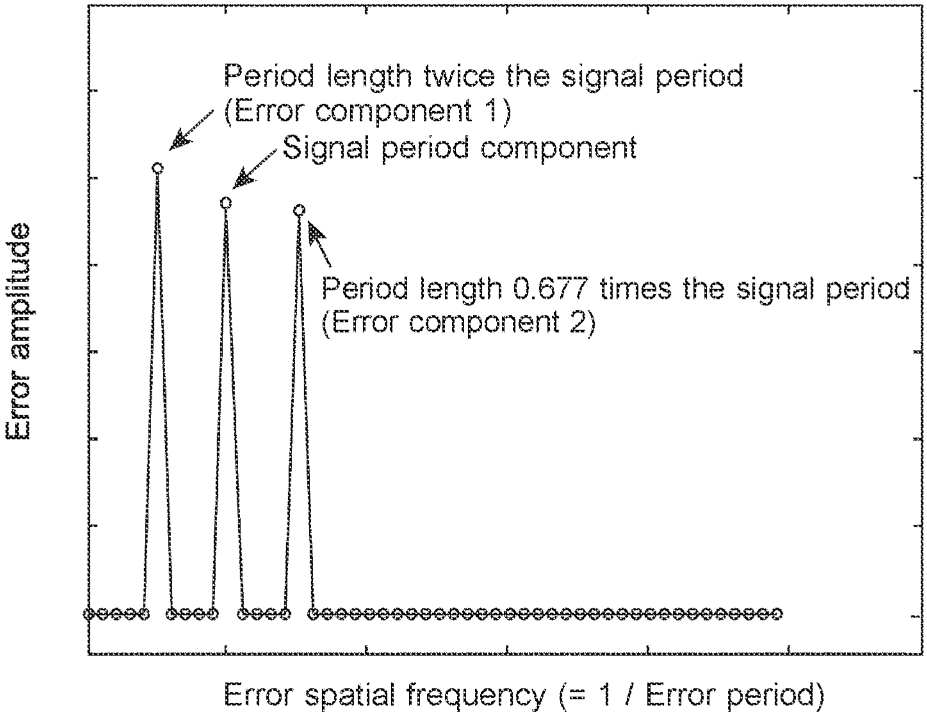
FIG. 6B is a graph showing the amplitude of the error in FIG. 6A.

FIG. 5A is a graph showing the detection signals when the ideal interference fringes including only ±1-order light rays are detected with four light-receiving elements, and FIG. 5B is a graph showing the amplitude of the error in FIG. 5A. In addition, FIG. 6A is a graph showing the detections signals when the interference fringes including the 0-order light ray and the ±2-order light rays which are mixed in at intensities of 50% and 14%, respectively, when based on the ±1-order light rays, are detected with the four light-receiving elements, and FIG. 6B is a graph showing the amplitude of the error in FIG. 6A. The vertical and horizontal axes of each graph are as described above. The frequency analysis of the detection signals obtained by the calculation shows that the "error component 1", which is the number-of-elements-induced error with a period twice the original signal period, and the "error component 2", which is the number-of-elements-induced error with a period 0.667 times the original signal period, are present.

Figure 7:
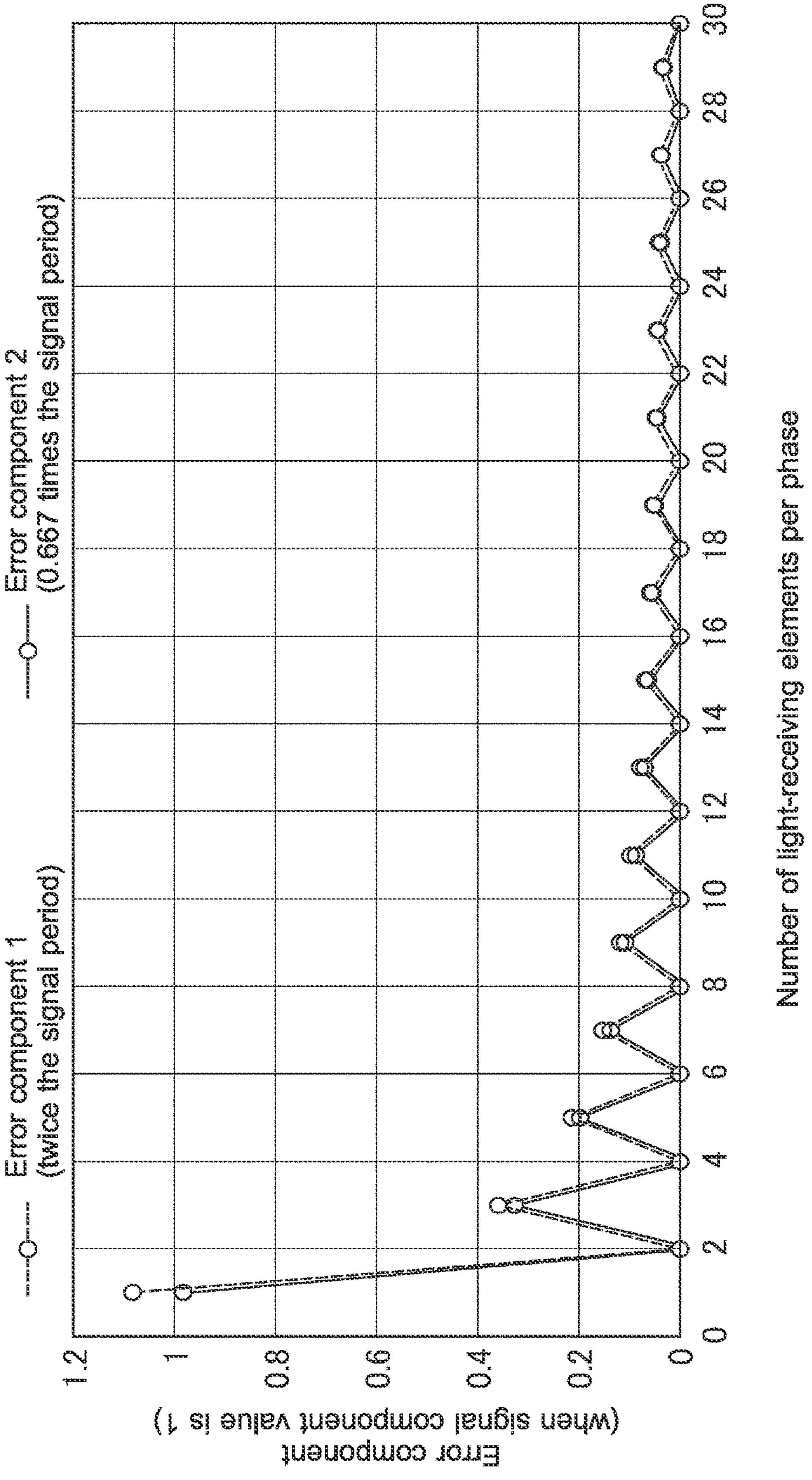
FIG. 7 is a graph showing the calculation result when the total number of light-receiving elements in an element row is increased from 1 to 30.

FIG. 7 is a graph showing the calculation result when the total number of the light-receiving elements 70 in the element row 7 is increased from 1 to 30. Specifically, FIG. 7 is a graph showing the number of light-receiving elements from 1 to 30 on the horizontal axis, and the error components remaining in the detection signals on the vertical axis. The magnitude of the error component is defined as the ratio when the amplitude component of the signal is set to be "1".

As in the above-described Japanese Patent Application Nos. 2018-105845 and 2019-219347, if the total number of functional light-receiving elements in the element row 7 is an even number, the error component, which is the number-of-elements-induced error, is zero. However, if the total number of functional light-receiving elements becomes an odd number, the number-of-elements-induced error may occur, and high accuracy may not be obtained in a stable manner.

Figure 8:
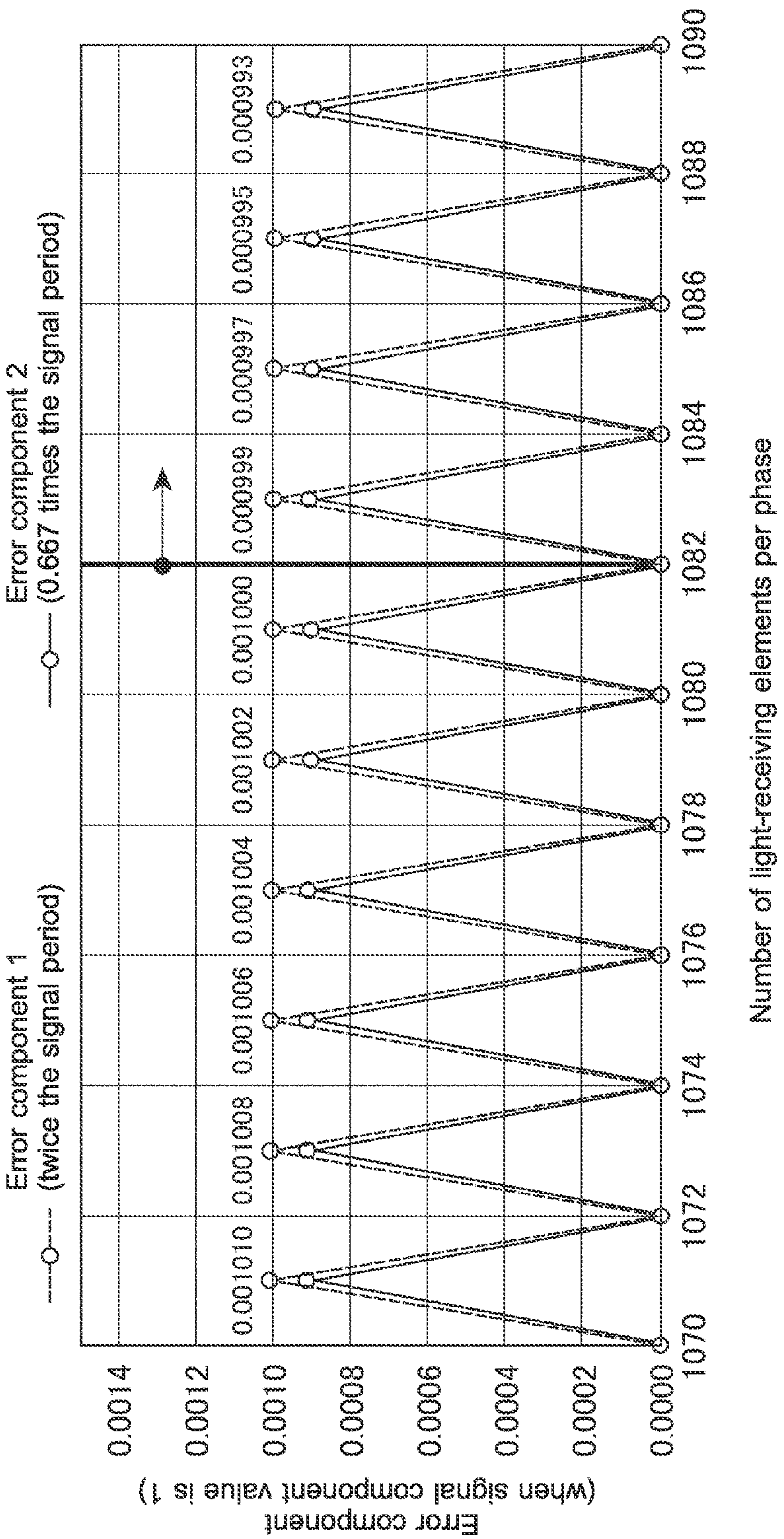
FIG. 8 is a graph showing the calculation result when the total number of light-receiving elements in an element row is increased from 1,070 to about 1,090.

FIG. 8 is a graph showing the calculation result when the total number of light-receiving elements 70 is increased from 1,070 to about 1,090. The optical encoder 1 may be able to suppress the number-of-elements-induced error to about 0.001 (0.1%) even if the total number of functional light-receiving elements 70 becomes an odd number by increasing the total number of light-receiving elements 70 in the element row 7 and enhancing the averaging effect.

Specifically, as shown in FIG. 8, when the total number of light-receiving elements 70 is set to be 1,082 or more, the error component 1 and error component 2 are both less than 0.001 (0.1%). Based on this, regarding the intensity of the unwanted light with respect to the intensity of the signal light (i.e., ±1-order light rays) delivered to the light-receiving means 6, in the optical encoder 1 configured such that the intensity of the 0-order light ray is 50% or less and the intensities of the ±2-order light rays are 14% or less with respect to the intensity of the signal light (i.e., ±1-order light rays), the accuracy may be maintained, in a stable manner, by setting the total number of light-receiving elements 70 to be 1,082 or more.

In this way, by increasing the number of light-receiving elements 70 and enhancing the averaging effect, the effect of the unwanted light can be reduced in a stable manner, even if the total number of functional light-receiving elements 70 becomes an odd number, without being affected by various disturbance factors.

According to such first embodiment, the following advantageous effects can be achieved:

(1) under the above-described conditions, the optical encoder 1 can reduce the error, even if the number of functional light-receiving elements 70 is an odd number, by arranging the light-receiving elements 70 in a number where the number-of-elements-induced error is smaller than the allowable error. Accordingly, the optical encoder 1 can reduce the effect of the unwanted light in a stable manner, even if the total number of functional light-receiving elements 70 becomes an odd number due to malfunctioning, contamination, or the like;

(2) in a predetermined configuration where interference fringes formed by the ±1-order light rays are used for detection, the optical encoder 1 can reduce the effect of unwanted light in a stable manner, even if the total number of functional light-receiving elements becomes an odd number due to malfunctioning, contamination, or the like;

(3) since the diffracted light rays diverging from the scale 2 can be efficiently collected onto the light-receiving surface, the diffracted light rays required for the signal can be efficiently collected and more optical power (amount of light) can be obtained compared to the case where the optical element is not used; and (4) by employing a diffraction grating plate for the optical element 5, a configuration where diffracted light rays diverging from the scale 2 can be efficiently collected onto the light-receiving surface, can be easily achieved.

Second Embodiment

The second embodiment of the present invention will now be described below. In the following description, previously described parts are denoted by the same reference numbers and the descriptions thereof will be omitted.

According to the above-described first embodiment, in the optical encoder 1 shown in FIGS. 1 and 2, the light source 4 has a light wavelength of 660 nm and is disposed such that the angle of incidence θ of the light to the graduations 20 of the scale 2 is 30 degrees, and the period f of the graduations 20 of the scale 2 is 2 μm, the period g of the grating 55 of the optical element 5 is 1.375 μm, and the period h of the light-receiving elements is 2.2 μm.

The optical encoder 1 shown in FIGS. 1 and 2 according to the second embodiment is configured as follows. Specifically, as with the above-described first embodiment, the light source 4 has a light wavelength of 660 nm and is disposed such that the angle of incidence θ of the light to the graduations 20 of the scale 2 is 30 degrees (see FIG. 1).

However, in contrast to the above-described first embodiment, the second embodiment is configured such that the period f of the graduations 20 of the scale 2 (see FIGS. 1 and 2) is 1 μm, the period g of the grating 55 of the optical element 5 is 0.4 μm (see FIGS. 1 and 2), and the period h of the light-receiving elements 70 in the element row 7 of the light-receiving means 6 is 1 μm (see FIGS. 1 and 2).

For the optical encoder 1 according to the second embodiment, the period f of the graduations 20 of the scale 2 is 1 μm, and is therefore finer than the period f of the graduations in the above-described first embodiment, which is 2 μm. Thus, the resultant diffracted light diffracted by the scale 2 includes only the 0-order light ray and the ±1-order light rays, and no ±2-order or higher light rays, i.e., no ±2-order or higher diffracted light rays are present. Accordingly, even with the optical encoder 1 with the above-described configuration, the number-of-elements-induced error can still be suppressed to about 0.001 (0.1%) and the effect of the unwanted light can be reduced in a stable manner without being affected by various disturbance factors, even if the total number of functional light-receiving elements 70 becomes an odd number, by increasing the total number of light-receiving elements 70 in the element row 7 and enhancing the averaging effect.

In such second embodiment, the same advantageous effects as those of the above-described first embodiment can be achieved.

VARIATION OF EMBODIMENTS

It should be noted that the present invention is not limited to the above-described embodiments, and any variation, improvement, etc., is included in the present invention to the extent that they can achieve the object of the present invention.

For example, in the above-described respective embodiments, the case where the present invention is employed in the optical encoder 1, which is a linear encoder, has been described, but the encoder is not particularly limited as to the format of the detector, the detection method, and the like, as long as it is an optical encoder. In the above-described respective embodiments, the scale 2 of the optical encoder 1 is of a reflective type that reflects the light from the light source 4, but the scale may be of a transmissive type. If the scale is of a transmissive type, the optical encoder can be configured accordingly. For example, the graduations 20 include a reflective part and a non-reflective part, and the reflective part may be a metal plate, or the like. However, if the scale of the optical encoder is of a transmissive type, the graduations may be holes formed in the scale in a grid pattern. In addition, the graduations may be formed by applying, for example, a membrane, or the like, formed in a grid pattern that does not transmit light, to the scale plate.

In the above-described respective embodiments, the allowable error is 0.1%, and the number of light-receiving elements 70 is adjusted so that the number-of-elements-induced error is 0.1% or less. However, the allowable error can be freely set, as the target value, depending to the performance of the optical encoder. Therefore, the allowable error may not need to be 0.1% and it may instead be 0.1% or more, or 0.1% or less, as long as the optical encoder is designed such that the number-of-elements-induced error does not exceed the allowable error, with the allowable error being set as the target value.

In the above-described first embodiment, the light wavelength of the light source 4 is 660 nm, the angle of incidence of the light from the light source 4 to the scale 2 is 30 degrees, the period of the graduations 20 is 2 μm, the period of the grating 55 of the optical element 5 is 1.375 μm, and the period of the light-receiving elements 70 is 2.2 μm. In the above-described second embodiment, the period of the graduations 20 is 1 μm, the period of the grating 55 of the optical element 5 is 0.4 μm, and the period of the light-receiving elements 70 is 1 μm. In addition, regarding the intensity of the unwanted light with respect to the intensities of the ±1-order light rays delivered to the light-receiving means 6, the optical encoder 1 is configured such that the intensity of the 0-order light ray is 50% or less, and the intensities of the ±2-order light rays are 14% or less. When the allowable error is set to be 0.1%, the number of light-receiving elements 70 in the element row 7 is set to be 1,082 or more, which is the number where the number-of-elements-induced error will be 0.1% or less.

The light-receiving surface of the light-receiving means of the optical encoder includes an element row with multiple light-receiving elements arranged along the measurement direction with the same period as that of the interference fringes. However, the optical encoder may have any configuration and/or may employ any light-receiving means, as long as the number of light-receiving elements in the element row is set to be a number where the number-of-elements-induced error is smaller than the allowable error. Such the number-of-elements-induced error is caused when there is an odd total number of light-receiving elements and such odd total number of light-receiving elements are functional, or when there is an even total number of light-receiving elements but one less than such even total number of light-receiving elements are functional.

For example, the light-receiving means preferably converts the interference fringes received at the light-receiving surface into detection signals that vary in a corresponding manner to the period of the graduations in accordance with the relative movement between the scale and the detection head, and then outputs such detection signals, with the detection signals being differential signals of at least two phases with different phases. In doing so, the light-receiving surface preferably includes a group of element rows where at least two element rows are arranged along a direction orthogonal to the measurement direction. This is because, according to such configuration, the optical encoder can prevent errors that may occur due to contamination, even if any of the light-receiving elements is contaminated.

Hereinafter, the variations of the light-receiving means where at least two element rows are arranged will be described.

Figure 9:
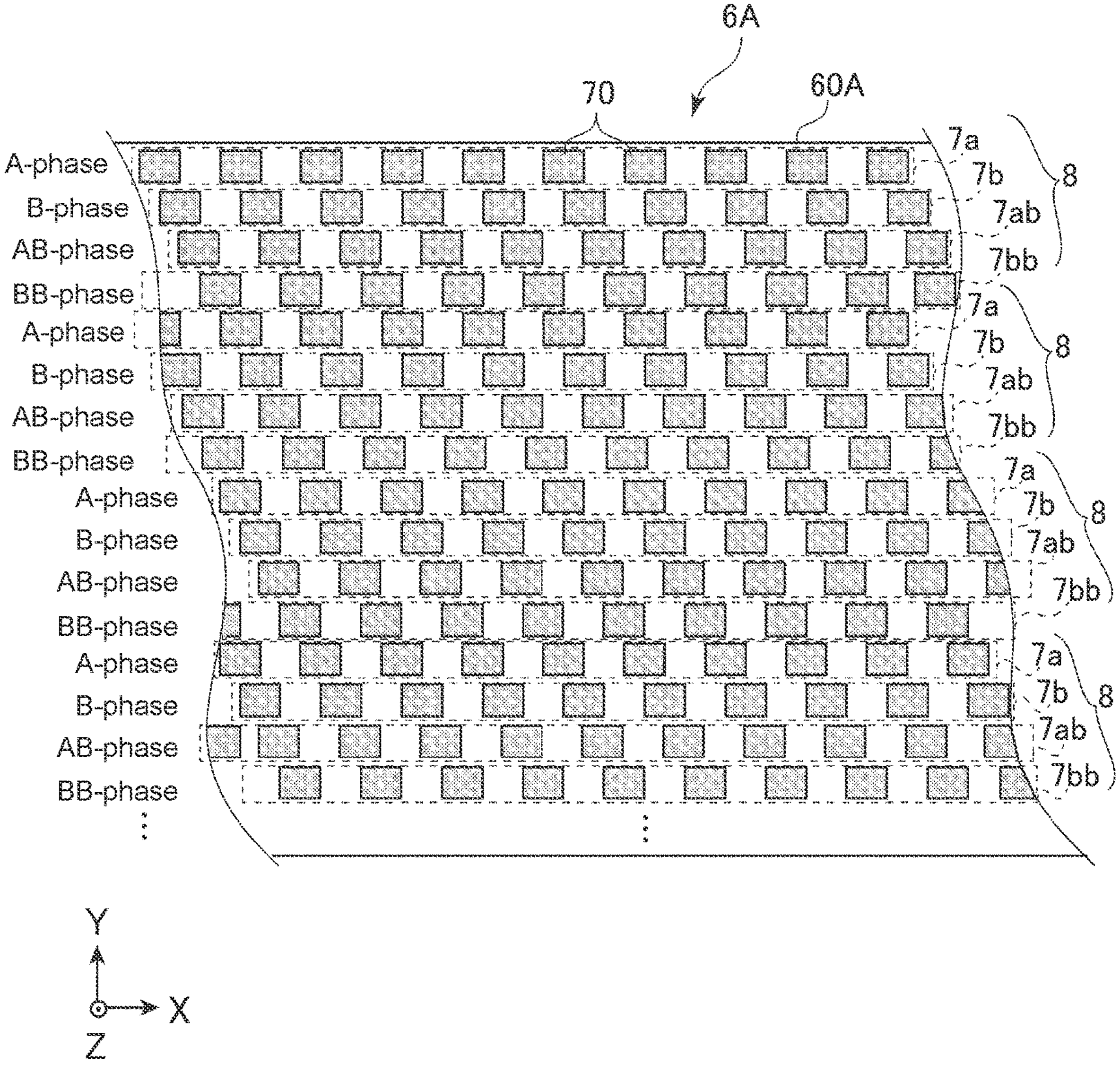
FIG. 9 is a diagram showing the light-receiving means according to a first variation.

FIG. 9 is a diagram showing the light-receiving means 6A according to a first variation.

The light-receiving means according to the first variation converts the interference fringes received at the light-receiving surface into detection signals that vary in a corresponding manner to the period of the graduations in accordance with the relative movement between the scale and the detection head, and then outputs such detection signals, with the detection signals being differential signals of two phases with different phases.

As shown in FIG. 9, the light-receiving surface 60A includes element rows 7*a*, 7*b*, lab, and 7*bb* with multiple light-receiving elements 70 arranged along the measurement direction (X-direction) with a period corresponding to that of the graduations (see FIGS. 1 and 2), and an element row group 8 where four such element rows 7*a*, 7*b*, 7*ab*, and 7*bb* are arranged together along a direction (Y-direction) orthogonal to the measurement direction.

The element rows 7*a*, 7*b*, 7*ab*, and 7*bb* include, regarding each of the two phases, positive-phase signal element rows that output positive-phase signals and negative-phase signal element rows that output negative-phase signals. These two phases are staggered along the measurement direction with a predetermined phase difference. Multiple element row groups 8 are arranged along the orthogonal direction in the light-receiving surface 60A.

Here, the positive-phase signals of the two phases will be referred to as a first signal and a second signal, the negative-phase signal of the first signal will be referred to as a third signal, and the negative-phase signal of the second signal will be referred to as a fourth signal. The element rows 7*a*, 7*b*, 7*ab*, and 7*bb* in the element row group 8 are arranged along the direction orthogonal to the measurement direction in the order of: the positive-phase signal element row 7*a* that outputs the first signal; the positive-phase signal element row 7*b* that outputs the second signal; the negative-phase signal element row 7*ab* that outputs the third signal, and the negative-phase signal element row 7*bb* that outputs the fourth signal.

According to this configuration, the light-receiving means 6A can obtain four-phase signals as detection signals while preventing the errors that may occur due to contamination.

Figure 10:
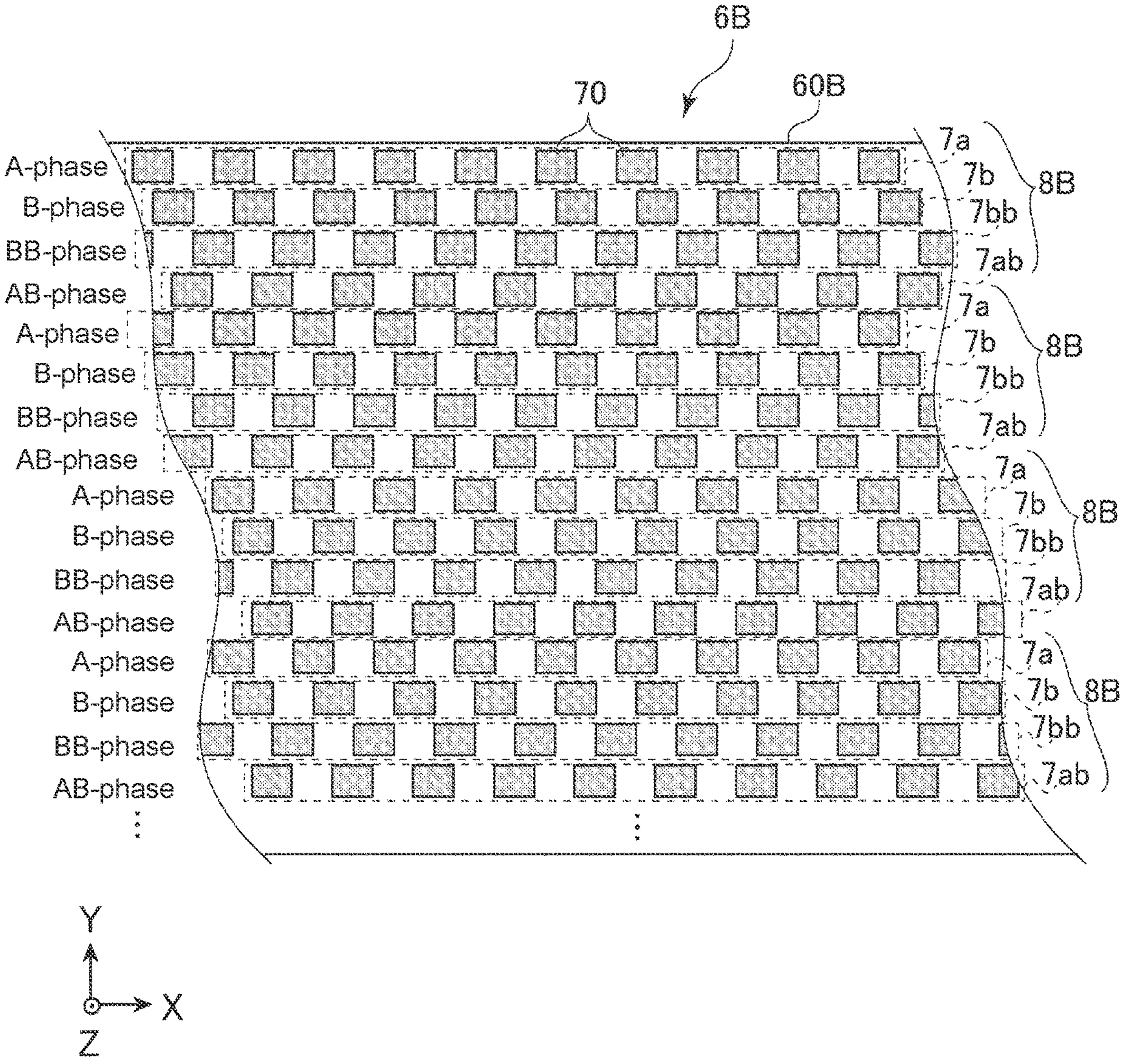
FIG. 10 is a diagram showing the light-receiving means according to a second variation.

FIG. 10 is a diagram showing the light-receiving means 6B according to a second variation.

As shown in FIG. 10, the light-receiving surface 60B of the light-receiving means 6B according to the second variation includes element rows 7*a*, 7*b*, 7*ab*, and 7*bb*. The respective element rows 7*a*, 7*b*, 7*bb*, and 7*ab* include multiple light-receiving elements 70 arranged along the measurement direction (X-direction) with a period corresponding to that of the graduations 20 (see FIGS. 1 and 2). The element rows 7*a*, 7*b*, 7*bb*, and 7*ab* are arranged together along a direction (Y-direction) orthogonal to the measurement direction.

In addition, the light-receiving surface 60B includes element row groups 8B, with each group including four element rows 7*a*, 7*b*, 7*bb*, and 7*ab*. An element row group 8B includes four element rows 7*a*, 7*b*, 7*bb*, and 7*ab*. Multiple element row groups 8B are arranged along the Y-direction in the light-receiving surface 60B.

Figure 11:
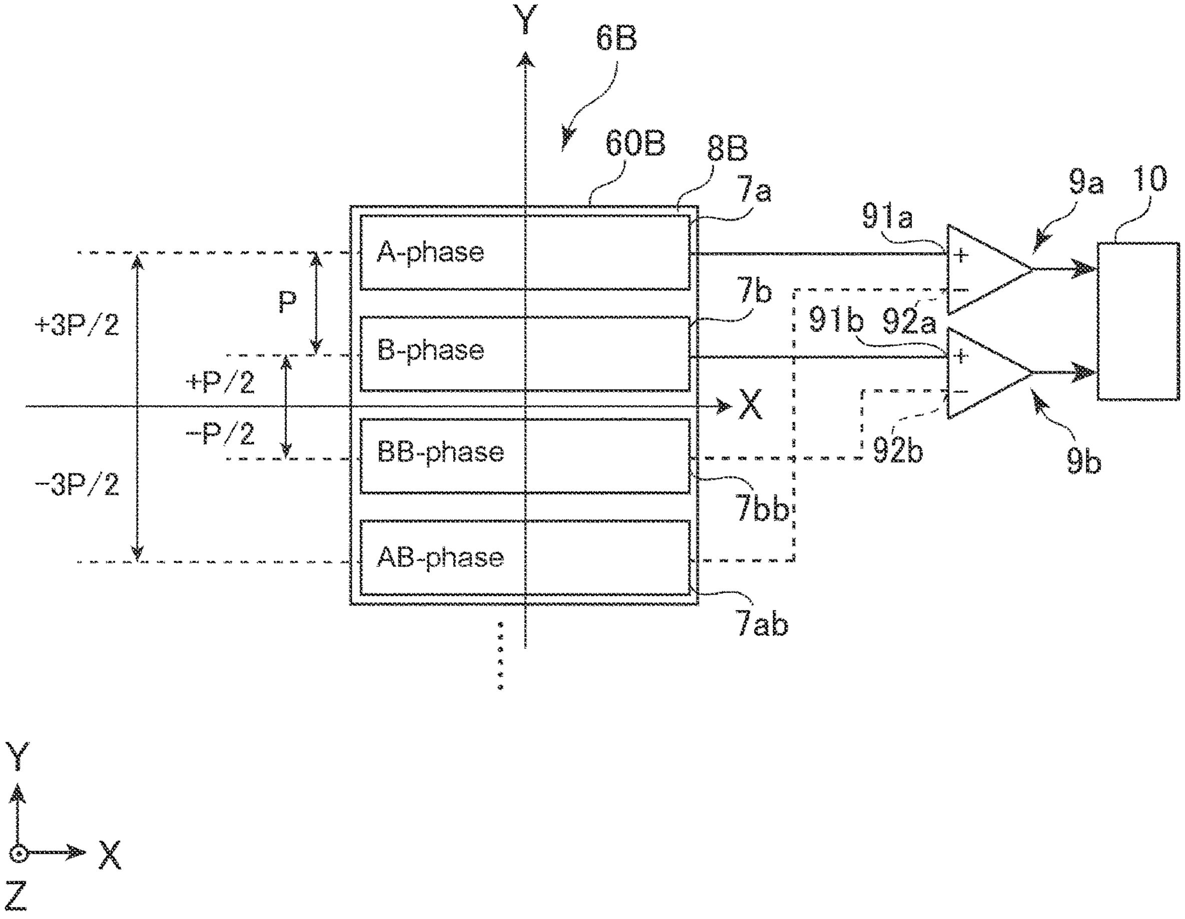
FIG. 11 is a schematic diagram showing the light-receiving means according to the second variation, a signal input/output unit, and operation means.

FIG. 11 is a schematic diagram showing the light-receiving means 6B according to the second variation, a signal input/output unit 9, and operation means 10.

As shown in FIG. 11, the element row group 8B includes the first element row 7*a*, the second element row 7*b*, the third element row 7*bb*, and the fourth element row 7*ab*, in this order, from the +Y-direction side to the −Y-direction side (from top to bottom in the drawing). The element rows 7*a*, 7*b*, 7*bb*, and 7*ab* are arranged along the Y-direction with a predetermined pitch P. The element rows 7*a*, 7*b*, 7*bb*, and 7*ab* include, regarding each of the two phases, positive-phase signal element rows (the first element row 7*a* and the second element row 7*b*) that output positive-phase signals, and negative-phase signal element rows (the third element row 7*bb* and the fourth element row 7*ab*) that output negative-phase signals.

The first element row 7*a* outputs the A-phase signal, which is the positive-phase signal of the A-phase. The second element row 7*b* outputs the B-phase signal, which is the positive-phase signal of the B-phase. The third element row 7*bb* outputs the BB-phase signal, which is the negative-phase signal of the B-phase. The fourth element row 7*ab* outputs the AB-phase signal, which is the negative-phase signal of the A-phase. Accordingly, the first element row 7*a* and the second element row 7*b* correspond to the positive-phase signal element rows in the present invention. In addition, the third element row 7*bb* and the fourth element row 7*ab* correspond to the negative-phase signal element rows in the present invention.

In addition, the element rows 7*a*, 7*b*, 7*bb*, and 7*ab* are staggered along the X-direction with a predetermined phase difference. Specifically, based on the A-phase signal, the B-phase signal is arranged with a phase difference of 90°, the AB-phase signal is arranged with a phase difference of 180°, and the BB-phase signal is arranged with a phase difference of 270°. Therefore, with respect to the first element row 7*a*, the second element row 7*b* is staggered along the X-direction with a phase difference of 90°, the third element row 7*b* is staggered along the X-direction with a phase difference of 270°, and the fourth element row 7*ab* is staggered along the X-direction with a phase difference of 180°.

The first element row 7*a* and the second element row 7*b*, which are the positive-phase signal element rows, account for half (e.g., two rows) of the multiple (e.g., four) element rows 7*a*, 7*b*, 7*bb*, and 7*ab* in the element row group 8B, and are arranged on one side (i.e., the +Y-direction side) with respect to the center, which is the intersection point between the Y-direction and the X-axis, in the light-receiving surface 60B. In addition, the third element row 7*bb* and the fourth element row 7*ab*, which are the negative-phase signal element rows, account for half (e.g., two rows) of the multiple (e.g., four) element rows 7*a*, 7*b*, 7*bb*, and 7*ab* in the element row group 8B, and are arranged on the other side (i.e., the −Y-direction side) with respect to the center, which is the intersection point between the Y-direction and the X-axis, in the light-receiving surface 60B.

In addition, the optical encoder 1 comprises: a first signal input/output unit 9*a* and a second signal input/output unit 9*b*, which use the detection signals output from the light-receiving means 6B as inputs of differential signals; and the operation means 10, which operates the amount of relative movement between the scale 2 (see FIGS. 1 and 2) and the detection head 3 based on the differential signals output from the two signal input/output units 9*a* and 9*b*.

The two signal input/output units 9*a* and 9*b* respectively include positive-phase signal input/output units 91*a* and 91*b*, where positive-phase signals are input as detection signals from the light-receiving means 6B, and respectively include negative-phase signal input/output units 92*a* and 92*b*, where negative-phase signals are input.

At the first signal input/output unit 9*a*, the A-phase signal is input to the positive-phase signal input/output unit 91*a* from the first element row 7*a* of the light-receiving means 6B, and the AB-phase signal is input to the negative-phase signal input/output unit 92*a* from the fourth element row lab. Then, the first signal input/output unit 9*a* outputs a differential A-phase signal, which is the difference between the A-phase signal and the AB-phase signal (i.e., the A-phase signal−the AB-phase signal), to the operation means 10.

At the second signal input/output unit 9*b*, the B-phase signal is input to the positive-phase signal input/output unit 91*b* from the second element row 7*b* of the light-receiving means 6B, and the BB-phase signal is input to the negative-phase signal input/output unit 92*b* from the third element row 7*bb*. Then, the second signal input/output unit 9*b* outputs a differential B-phase signal, which is the difference between the B-phase signal and the BB-phase signal (i.e., the B-phase signal−the BB-phase signal), to the operation means 10. In the figures in the following description, the positive-phase signals are indicated with a solid line and the negative-phase signals are indicated with a dashed line, regarding the inputs to two signal input/output units 9*a* and 9*b* from the element rows 7*a*, 7*b*, 7*bb*, and 7*ab*.

The element rows 7*a*, 7*b*, 7*bb*, and 7*ab* in the element row group 8B are arranged at positions where the sum of the distance in the +Y-direction from a reference position to a positive-phase signal element row (the first element row 7*a* or the second element row 7*b*) and the distance in the −Y-direction from the reference position to a negative-phase signal element row (the third element row 7*bb* or the fourth element row 7*ab*) is equal for all phases.

Here, the reference position refers to a predetermined position on the light-receiving surface 60B, and the description will be provided using the X-axis in the figures as the reference position in the present embodiment.

The first element row 7*a* is located at a distance of +3P/2 in the +Y-direction from the reference position. The second element row 7*b* is located at a distance of +P/2 in the +Y-direction from the reference position. The third element row 7*bb* is located at a distance of −P/2 in the −Y-direction from the reference position. The fourth element row 7*ab* is located at a distance of −3P/2 in the −Y-direction from the reference position.

The sum of the distance between the first element row 7*a*, which outputs the A-phase signal, and the reference position and the distance between the fourth element row 7*ab*, which outputs the AB-phase signal, and the reference position, is as expressed in Equation (6) below, with the A-phase signal and the AB-phase signal serving as inputs for the differential A-phase signal. In addition, the sum of the distance between the second element row 7*b*, which outputs the B-phase signal, and the reference position and the distance between the third element row 7*bb*, which outputs the BB-phase signal, and the reference position, is as expressed in Equation (7) below, with the B-phase signal and the BB-phase signal serving as inputs for the differential B-phase signal.

$$(+3P/2)+(-3P/2)=0 \quad (6)$$

$$(+P/2)+(-P/2)=0 \quad (7)$$

As indicated in Equations (6) and (7), the element rows 7*a*, 7*b*, 7*bb*, and 7*ab* in the element row group 8B are arranged at positions where the sum of the distance in the +Y-direction from the reference position to a positive-phase signal element row (the first element row 7*a* or the second element row 7*b*) and the distance in the −Y-direction from the reference position to a negative-phase signal element row (the third element row 7*bb* or the fourth element row 7*ab*) is equal for the differential A-phase signal and the differential B-phase signal.

Here, the surface on which the graduations 20 (see FIGS. 1 and 2) are arranged of the scale 2 is preferably parallel to the light-receiving surface 60. However, a shift may occur in the phase difference of the differential signals if the surface on which the graduations 20 are arranged (hereinafter, simply referred to as the "scale 2") of the scale 2 is arranged, with respect to the light-receiving surface, with a rotation and a tilt around a rotation axis, with the axis being orthogonal to the light-receiving surface 60B, in the process of manufacturing and/or use. There is a problem that this shift in the phase difference may cause a deterioration in the accuracy of the optical encoder.

However, according to the above-described configuration, it is possible to cancel out the shift in the phase difference of the differential signals, which is caused by the scale 2 being arranged, with respect to the light-receiving surface 60B, with a rotation and a tilt around a rotation axis, with the axis being orthogonal to the light-receiving surface 60B. Therefore, the deterioration in the accuracy can be prevented even if the scale 2 is arranged, with respect to the light-receiving surface 60B, with a rotation and a tilt around a rotation axis, with the axis being orthogonal to the light-receiving surface 60B.

Figure 12:
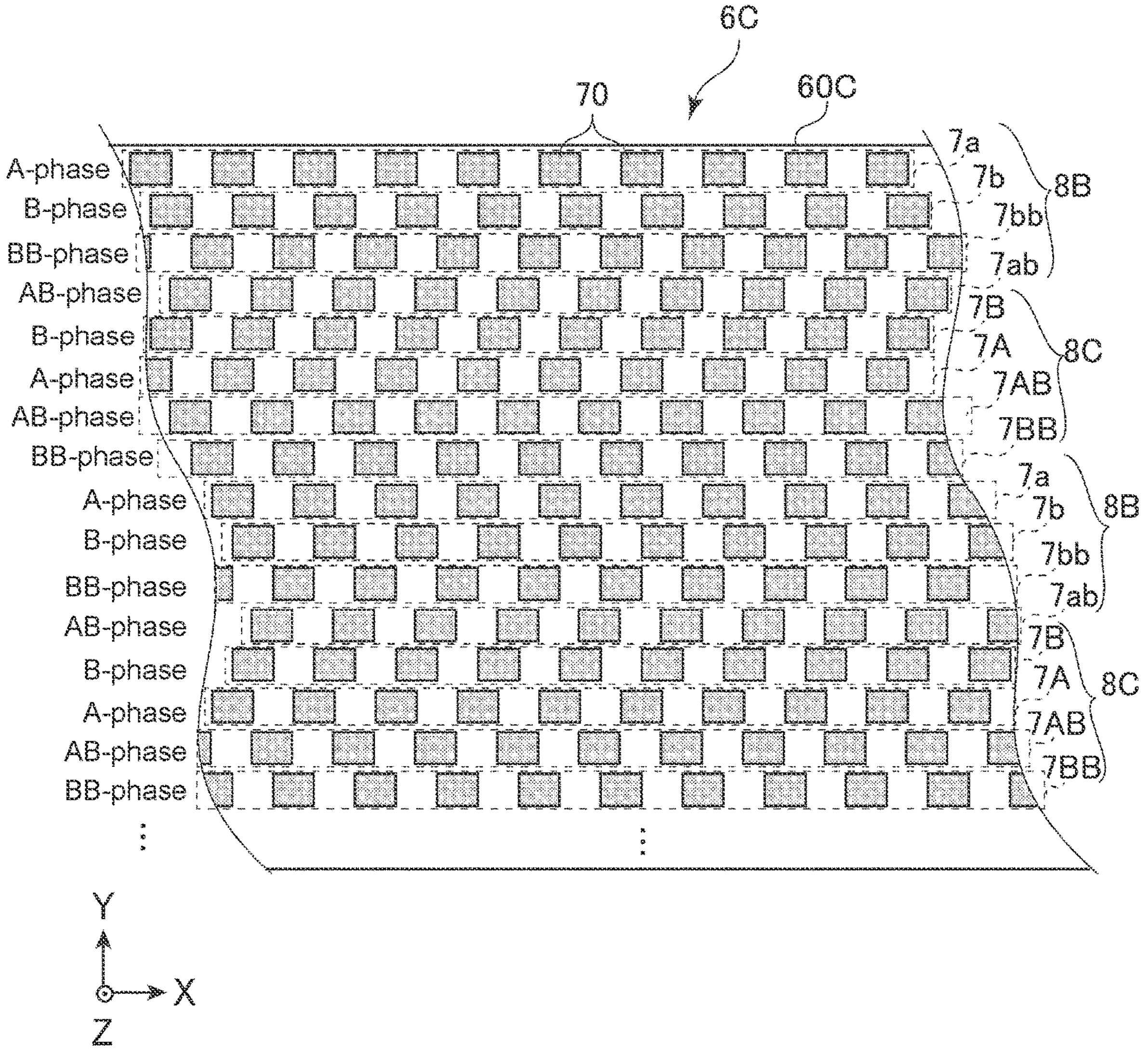
FIG. 12 is a diagram showing the light-receiving means according to a third variation.

FIG. 12 is a diagram showing the light-receiving means 6C according to a third variation.

As shown in FIG. 12, the light-receiving means 6C according to the third variation includes a first element row group 8B and a second element row group 8C, which is arranged adjacent to the first element row group 8B in the orthogonal direction (Y-direction) in the light-receiving surface 60C.

The second element row group 8C includes four element rows 7B, 7A, 7AB, and 7BB, which are in a different arrangement from that of the element rows 7*a*, 7*b*, 7*bb*, and lab in the first element row group 8B. The element rows 7B, 7A, 7AB, and 7BB are arranged together along a direction (Y-direction) orthogonal to the measurement direction. The first element row group 8B and the second element row group 8C are combined as a set of element row groups 8B and 8C, and multiple sets of element row groups 8B and 8C are arranged along the Y-direction in the light-receiving surface 60C. Specifically, the first element row group 8B and the second element row group 8C are arranged in an alternating and repeated manner along the Y-direction in the light-receiving surface 60C.

Figure 13:
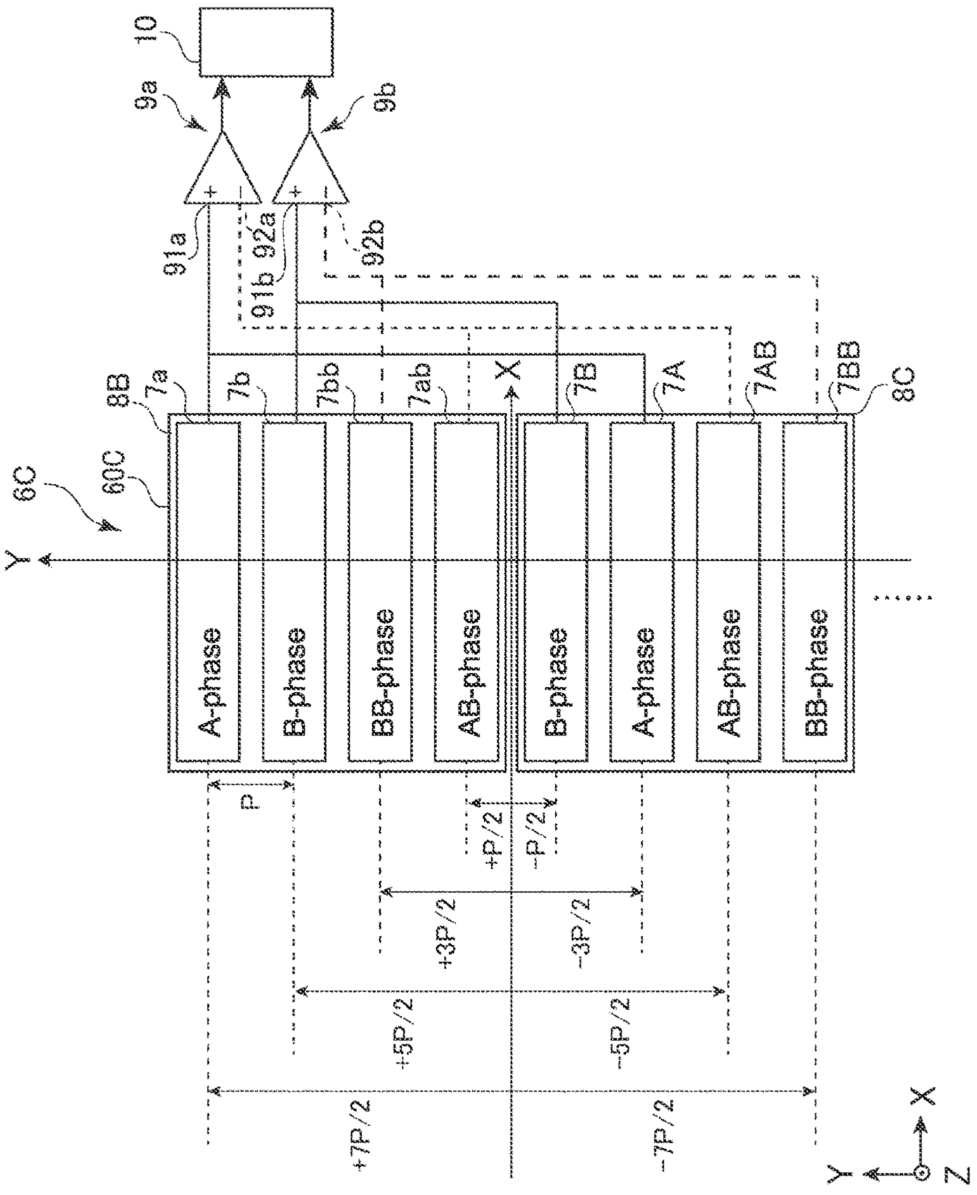
FIG. 13 is a schematic diagram showing the light-receiving means according to the third variation, the signal input/output unit, and the operation means.

FIG. 13 is a schematic diagram showing the light-receiving means 6C according to the third variation, the signal input/output unit 9, and the operation means 10.

As shown in FIG. 13, the second element row group 8C includes the fifth element row 7B, the sixth element row 7A, the seventh element row 7AB, and the eighth element row 7BB, in this order, from the +Y-direction side to the −Y-direction side (from top to bottom in the drawing). The element rows 7B, 7A, 7AB, and 7BB are arranged along the Y-direction with a predetermined pitch P.

The element rows 7B, 7A, 7AB, and 7BB include, regarding each of the two phases, positive-phase signal element rows (the fifth element row 7B and the sixth element row 7A) that output positive-phase signals, and negative-phase signal element rows (the seventh element row 7AB and the eighth element row 7BB) that output negative-phase signals.

In addition, the element rows 7B, 7A, 7AB, and 7BB are staggered along the X-direction with a predetermined phase difference. Specifically, with respect to the fifth element row 7B, the sixth element row 7A is staggered along the X-direction with a phase difference of 90°, the seventh element row 7AB is staggered along the X-direction with a phase difference of 270°, and the eighth element row 7BB is staggered along the X-direction with a phase difference of 180°.

The fifth element row 7B outputs the B-phase signal, which is the positive-phase signal of the B-phase. The sixth element row 7A outputs the A-phase signal, which is the positive-phase signal of the A-phase. The seventh element row 7AB outputs the AB-phase signal, which is the negative-phase signal of the A-phase. The eighth element row 7BB outputs the BB-phase signal, which is the negative-phase signal of the B-phase. Accordingly, the fifth element row 7B and the sixth element row 7A correspond to the positive-phase signal element rows in the present invention. In addition, the seventh element row 7AB and the eighth element row 7BB correspond to the negative-phase signal element rows in the present invention.

In the first element row group 8B, the positive-phase signal element rows (the first element row 7*a* and the second element row 7*b*) account for half (e.g., two rows) of the multiple (e.g., four) element rows 7*a*, 7*b*, 7*bb*, and lab in the first element row group 8B, and are arranged on the +Y-direction side with respect to the center of the Y-direction in the first element row group 8B. In addition, the positive-phase signal element rows (the first element row 7*a* and the second element row 7*b*) are arranged in an order that serves as a predetermined reference, from the one end side of the Y-direction toward the center (from bottom to top in the drawing) in the first element row group 8B. In the third variation, "the order that serves as a predetermined reference for the positive-phase signal element rows" corresponds to the order of the A-phase and then the B-phase.

In addition, in the second element row group 8C, the positive-phase signal element rows (the fifth element row 7B and the sixth element row 7A) account for half (e.g., two rows) of the multiple (e.g., four) element rows 7B, 7A, 7AB, and 7BB in the second element row group 8C, and are arranged on the +Y-direction side with respect to the center of the Y-direction in the second element row group 8C. In addition, the positive-phase signal element rows (the fifth element row 7B and the sixth element row 7A) are arranged in an order reverse to the order that serves as a predetermined reference, from the one end side of the Y-direction toward the center (from top to bottom in the drawing) in the second element row group 8C.

Specifically, since "the order that serves as a predetermined reference for the positive-phase signal element rows" corresponds to the order of the A-phase and then the B-phase, "the order reverse to the order that serves as a predetermined reference for the positive-phase signal element rows" corresponds to the order of the B-phase and then the A-phase. Therefore, if the positive-phase signal element rows of the first element row group 8B are arranged in the order of the first element row 7*a*, which outputs the A-phase signal, and the second element row 7*b*, which outputs the B-phase signal, from one end side of the Y-direction toward the center (from bottom to top in the drawing), the positive-phase signal element rows of the second element row group 8C are arranged in the order of the fifth element row 7B, which outputs the B-phase signal, and the sixth element row 7A, which outputs the A-phase signal, from one end side of the Y-direction toward the center (from top to bottom in the drawing), such that the order in which the two phases are arranged is reversed.

In the first element row group 8B, the negative-phase signal element rows (the third element row 7*bb* and the fourth element row 7*ab*) account for half (e.g., two rows) of the multiple element rows 7*a*, 7*b*, 7*bb*, and 7*ab* in the first element row group 8B (e.g., four rows), and are arranged on the −Y-direction side with respect to the center of the Y-direction in the first element row group 8B. In addition, the negative-phase signal element rows (the third element row 7*bb* and the fourth element row 7*ab*) are arranged in an order that serves as a predetermined reference, from the other end side of the Y-direction toward the center (from bottom to top in the drawing) in the first element row group 8B. In the third variation, "the order that serves as a predetermined reference for the negative-phase signal element rows" corresponds to the order of the AB-phase and then the BB-phase.

In addition, in the second element row group 8C, the negative-phase signal element rows (the seventh element row 7AB and the eighth element row 7BB) account for half (e.g., two rows) of the multiple (e.g., four) element rows 7B, 7A, 7AB, and 7BB in the second element row group 8C, and are arranged on the −Y-direction side with respect to the center of the Y-direction in the second element row group 8C. In addition, the negative-phase signal element rows (the seventh element row 7AB and the eighth element row 7BB) are arranged in an order reverse to the order that serves as a predetermined reference, from the other end side of the Y-direction toward the center (from bottom to top in the drawing) in the second element row group 8C.

Specifically, since "the order that serves as a predetermined reference for the negative-phase signal element rows" corresponds to the order of the AB-phase and then the BB-phase, "the order reverse to the order that serves as a predetermined reference for the negative-phase signal element rows" corresponds to the order of the BB-phase and then the AB-phase. Therefore, if the negative-phase signal element rows of the first element row group 8B are arranged in the order of the fourth element row lab, which outputs the AB-phase signal, and the third element row 7*bb*, which outputs the BB-phase signal, from the other end side of the Y-direction toward the center (from bottom to up in the drawing), the negative-phase signal element rows of the second element row group 8C are arranged in the order of the eighth element row 7BB, which outputs the BB-phase signal, and the seventh element row 7AB, which outputs the AB-phase signal, from the other end side of the Y-direction toward the center (from bottom to up in the drawing), such that the order in which the two phases are arranged is reversed.

In other words, the element rows 7*a*, 7*b*, 7*bb*, and lab in the first element row group 8B are arranged, from the +Y-direction side toward the −Y-direction side, such that their detection signals are output in the order that serves as a predetermined reference; namely, in the order of the A-phase signal, the B-phase signal, the BB-phase signal, and the AB-phase signal. Then, the element rows 7B, 7A, 7AB, and 7BB in the second element row group 8C are arranged, from the +Y-direction side toward the −Y-direction side, such that their detection signals are output in the order reversed to the order that serves as a predetermined reference; namely, in the order of the B-phase signal, the A-phase signal, the AB-phase signal, and the BB-phase signal.

Regarding the two signal input/output units 9*a* and 9*b*, at the first signal input/output unit 9*a*, the A-phase signals are input to the positive-phase signal input/output unit 91*a* from the first element row 7*a* and the sixth element row 7A of the light-receiving means 6C, and the AB-phase signals are input to the negative-phase signal input/output unit 92*a* from the fourth element row 7*ab* and the seventh element row 7AB. Then, the first signal input/output unit 9*a* outputs a differential A-phase signal, which is the difference between the A-phase signal and the AB-phase signal (i.e., the A-phase signal−the AB-phase signal), to the operation means 10.

At the second signal input/output unit 9*b*, the B-phase signals are input to the positive-phase signal input/output unit 91*b* from the second element row 7*b* and the fifth element row 7B of the light-receiving means 6C, and the BB-phase signals are input to the negative-phase signal input/output unit 92*b* from the third element row 7*bb* and the eighth element row 7BB. Then, the second signal input/output unit 9*b* outputs a differential B-phase signal, which is the difference between the B-phase signal and the BB-phase signal (i.e., the B-phase signal−the BB-phase signal), to the operation means 10.

The element rows 7*a*, 7*b*, 7*bb*, 7*ab*, 7B, 7A, 7AB, and 7BB in the first element row group 8B and the second element row group 8C are arranged at positions where the sum of the distance in the Y-direction from the reference position to a positive-phase signal element row (the first element row 7*a*, the second element row 7*b*, the fifth element row 7B, or the sixth element row 7A) and the distance in the Y-direction from the reference position to a negative-phase signal element row (the third element row 7*bb*, the fourth element row 7*ab*, the seventh element row 7AB, or the eighth element row 7BB), is equal for all phases of the two phases.

The first element row 7*a* is located at a distance of +7P/2 in the +Y-direction from the reference position. The second element row 7*b* is located at a distance of +5P/2 in the +Y-direction from the reference position. The third element row 7*bb* is located at a distance of +3P/2 in the +Y-direction from the reference position. The fourth element row 7*ab* is located at a distance of +P/2 in the +Y-direction from the reference position. The fifth element row 7B is located at a distance of −P/2 in the −Y-direction from the reference position. The sixth element row 7A is located at a distance of −3P/2 in the −Y-direction from the reference position. The seventh element row 7AB is located at a distance of −5P/2 in the −Y-direction from the reference position. The eighth element row 7BB is located at a distance of −7P/2 in the −Y-direction from the reference position.

The sum of: the distance between the first element row 7*a*, which outputs the A-phase signal, and the reference position; the distance between the sixth element row 7A, which outputs the A-phase signal, and the reference position; the distance between the fourth element row lab, which outputs the AB-phase signal, and the reference position; and the distance between the seventh element row 7AB, which outputs the AB-phase signal, and the reference position, is as expressed in Equation (8) below, with the A-phase signals and the AB-phase signals serving as inputs for the differential A-phase signal. In addition, the sum of: the distance between the second element row 7*b*, which outputs the B-phase signal, and the reference position; the distance between the fifth element row 7B, which outputs the B-phase signal, and the reference position; the distance between the third element row 7*bb*, which outputs the BB-phase signal, and the reference position; and the distance between the eighth element row 7BB, which outputs the BB-phase signal, and the reference position, is as expressed in Equation (9) below, with the B-phase signals and the BB-phase signals serving as inputs for the differential B-phase signal.

$$(+7P/2)+(-3P/2)+(+P/2)+(-5P/2)=0 \quad (8)$$

$$(+5P/2)+(-P/2)+(+3P/2)+(-7P/2)=0 \quad (9)$$

As indicated in Expressions (8) and (9), the element rows are arranged at positions where the sum of the distance in the Y-direction from the reference position to a positive-phase signal element row (the first element row 7*a*, the second element row 7*b*, the fifth element row 7B, or the sixth element row 7A) and the distance in the Y-direction from the reference position to a negative-phase signal element row (the third element row 7*bb*, the fourth element row lab, the seventh element row 7AB, or the eighth element row 7BB), is equal for the differential A-phase signal and the differential B-phase signal.

According to the above-described configuration, it is possible to efficiently cancel out the shift in the phase difference of the differential signals, which is caused by the scale 2 being arranged, with respect to the light-receiving means 6C, with a rotation and a tilt around a rotation axis, with the axis being orthogonal to the light-receiving surface 60C, while preventing the amplitude of the differential signals from becoming small, with the differential signals being based on the detection signals from the light-receiving means 6C. This may be contrasted with the case where the first element row group 8B and the second element row group 8C are not provided.

Figure 14:
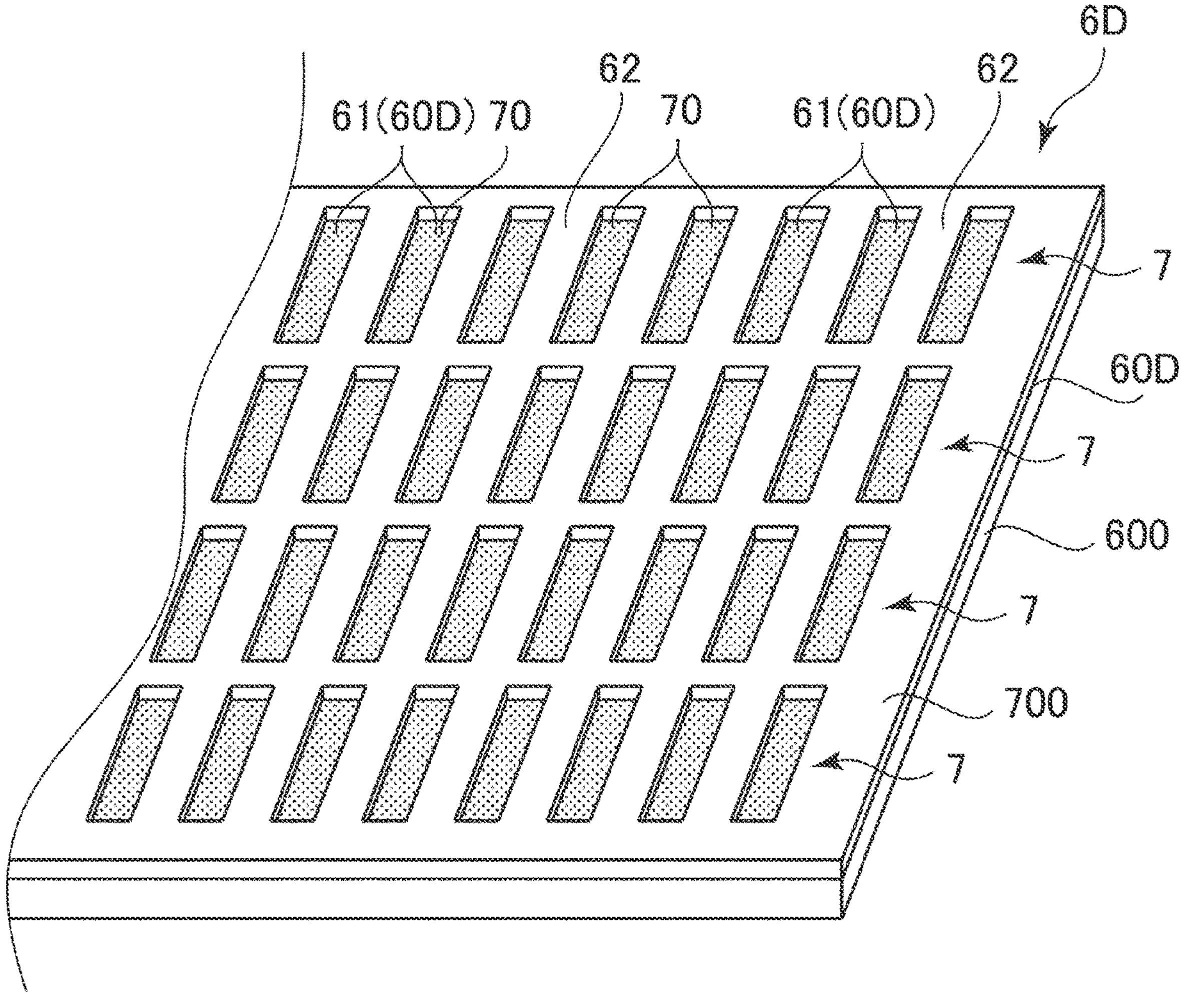
FIG. 14 is a diagram showing the light-receiving means according to a fourth variation.

FIG. 14 is a diagram showing the light-receiving means according to a fourth variation.

As shown in FIG. 14, the light-receiving means according to the fourth variation comprises: a photodiode 600 with an area larger than the total area of the total number of light-receiving elements 70; and a pattern-forming layer 700 arranged on the light-receiving surface 60D of the photodiode 600, with the pattern-forming layer 700 including a transmissive part 61 that transmits light therethrough and a non-transmissive part 62 that blocks the light. A plurality of such transmissive parts 61 is formed along the measurement direction (X-direction) with the same period as that of the interference fringes, and they function as light-receiving elements 70.

As described above, due to arrangement and/or size, there are cases where ready-made light-receiving elements cannot be employed; however, according to the above-described configuration, pseudo-fine light-receiving elements 70 can be formed by forming the transmissive parts 61 in a fine manner. Therefore, light-receiving elements can be freely designed without being restricted by the IC design rules.

Figure 15:
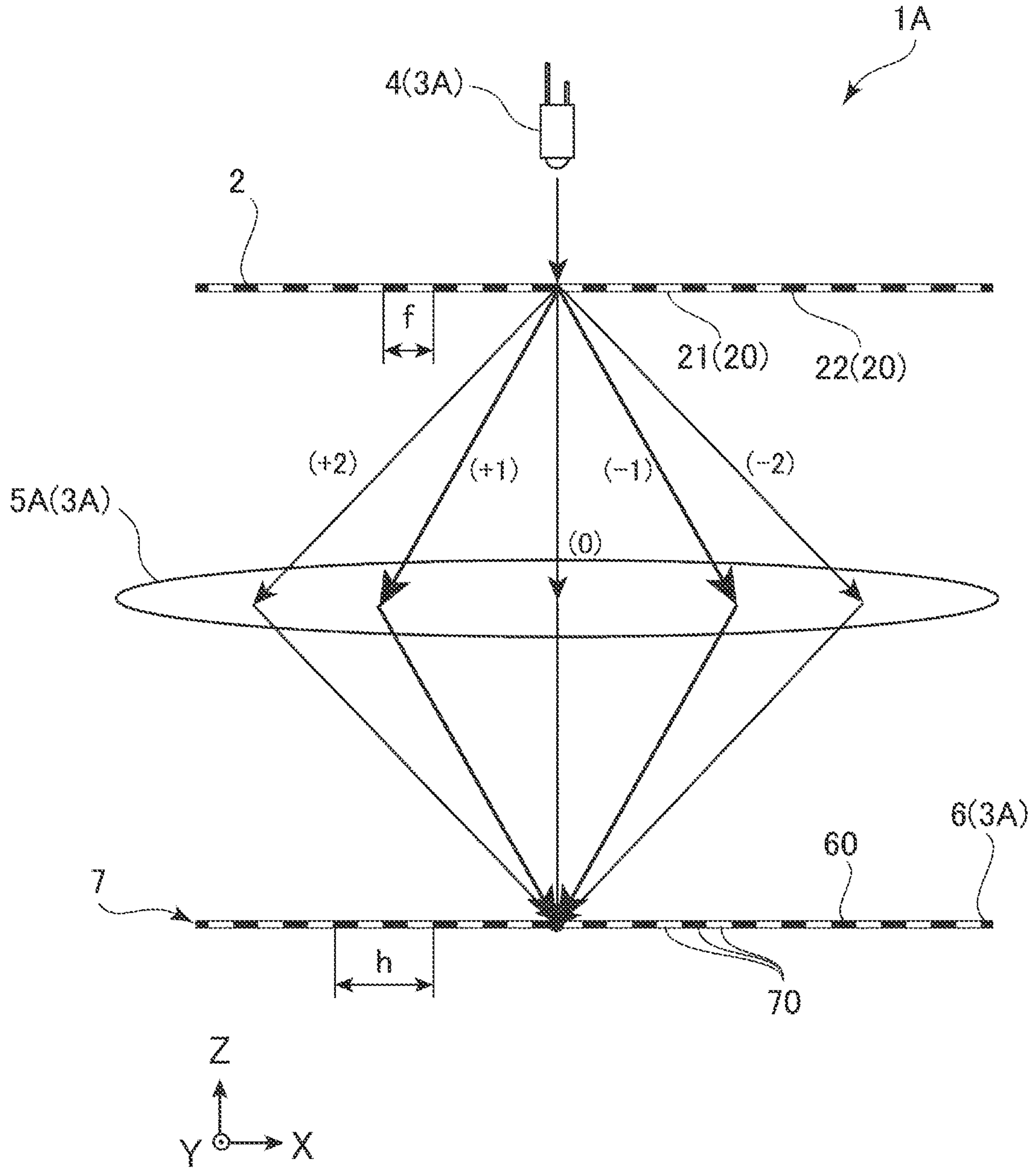
FIG. 15 is a diagram showing the light-receiving element according to a first variation.
Figure 16:
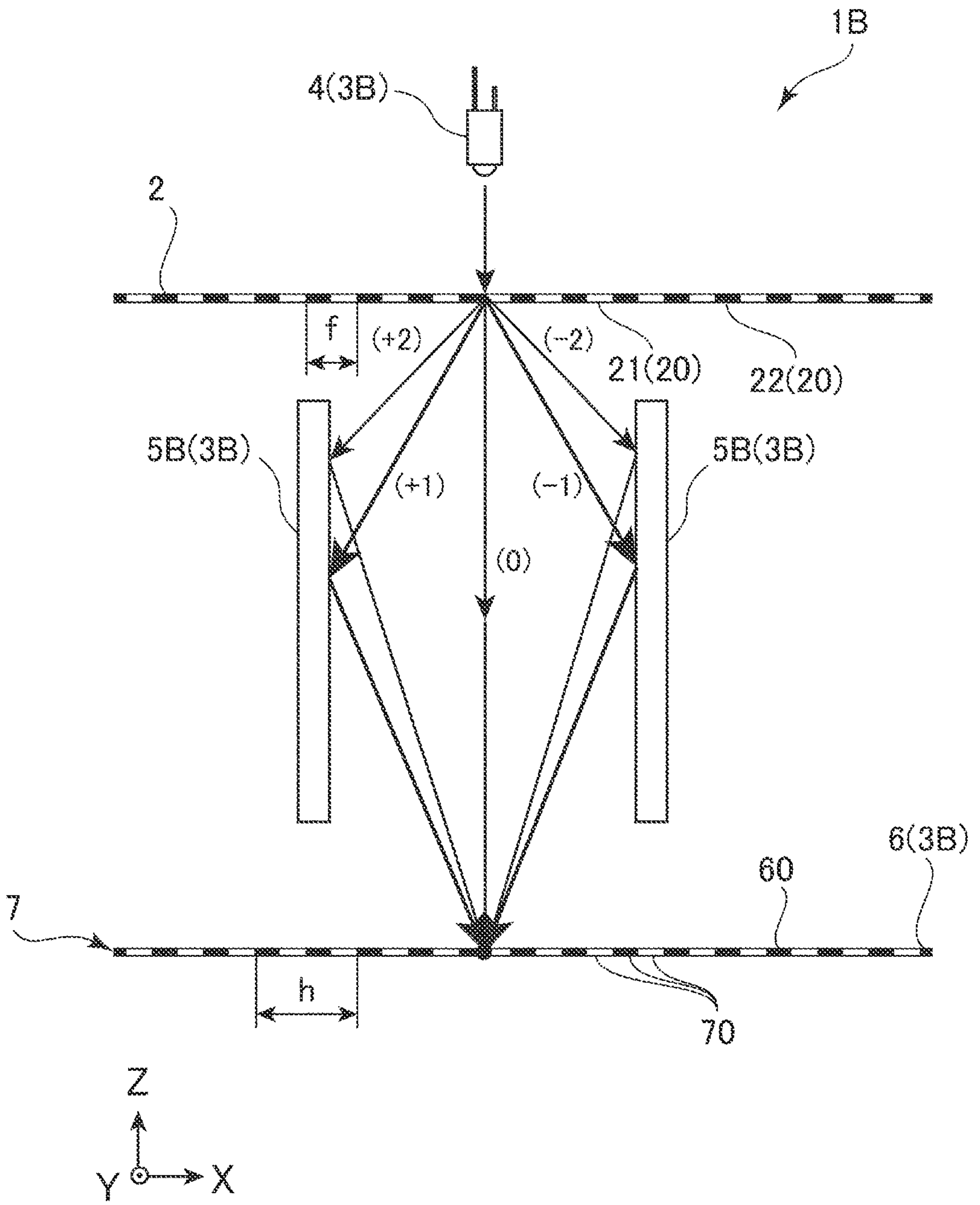
FIG. 16 is a diagram showing the light-receiving element according to a second variation.

FIG. 15 shows the light-receiving element according to a first variation, and FIG. 16 shows the light-receiving element according to a second variation.

In the above-described respective embodiments, the detection head 3 includes an optical element 5, and the optical element is a diffraction grating plate having a plate surface parallel to the surface of the scale on which the graduations are arranged and having a grating on the plate surface along a predetermined direction. However, the detection head may not need to comprise an optical element, and even if it does comprise an optical element, such optical element may still not need to be a diffraction grating plate and it may instead be any optical element as long as it is disposed between the scale and the light-receiving means and directs the light diffracted and divided by the scale onto the light-receiving surface. For example, the optical element may be a lens 5A disposed between the scale 2 and the light-receiving means 6, as in the detection head 3A of the optical encoder 1A shown in FIG. 15. The optical element may also be two mirrors 5B disposed perpendicularly to the light-receiving surface 60, as in the detection head 3B of the optical encoder 1B shown in FIG. 16. Further, the optical element is not limited to the above-described respective variations, and instead of a single lens 5A, multiple lenses may be combined, lenses of different shapes and arrangements may be used, or mirrors of different shapes and arrangements than the mirrors 5B may be used. The optical element may be a half mirror, a beamsplitter, or a combination of both.

INDUSTRIAL APPLICABILITY

As described above, the present invention can suitably be applied to optical encoders.

What is claimed is:

1. An optical encoder comprising: a plate-shaped scale having graduations formed along a measurement direction with a predetermined period, the graduations functioning as a diffraction grating for diffracting incident light; and a detection head provided, in a movable manner, relative to the scale along the measurement direction, wherein:

the detection head includes:

a light source that delivers light to the scale, and a light-receiving device with a light-receiving surface for receiving the light from the light source via the scale;

wherein the light that has passed through the scale forms, on the light-receiving surface, interference fringes that vary in a corresponding manner to the predetermined period of the graduations in accordance with the relative movement between the scale and the detection head;

the light-receiving surface has an element row with multiple light-receiving elements arranged along the measurement direction with a same period as that of the interference fringes; and wherein an error included in detection signals generated from the interference fringes obtained from the received light caused by an odd number of functional light-receiving elements is a number-of-elements-induced error, and wherein a predetermined allowable error is an allowable error, the number of light-receiving elements in the element row is set such that the number-of-elements-induced error is smaller than the allowable error.

2. The optical encoder according to claim 1, wherein:

the light-receiving device converts the interference fringes received at the light-receiving surface into detection signals that vary in a corresponding manner to the period of the graduations in accordance with the relative movement between the scale and the detection head, and then outputs such detection signals, with the said detection signals being differential signals of at least two phases with different phases; and the light-receiving surface includes a group of element rows where at least two element rows are arranged along a direction orthogonal to the measurement direction.

3. The optical encoder according to claim 2, wherein:

the light-receiving device converts the interference fringes received at the light-receiving surface into detection signals that vary in a corresponding manner to the period of the graduations in accordance with the relative movement between the scale and the detection head, and then outputs such detection signals, said detection signals being differential signals of two phases with different phases;

the light-receiving surface includes an element row with multiple light-receiving elements arranged along the measurement direction with a period corresponding to that of the graduations, and an element row group where four such element rows are arranged together along a direction orthogonal to the measurement direction;

the element rows include, for each of the two phases:

a positive-phase signal element row that outputs a positive-phase signal, which is one of the detection signals, and a negative-phase signal element row that outputs a negative-phase signal, which is one of the detection signals;

the two phases are staggered along the measurement direction with a predetermined phase difference;

multiple element row groups are arranged along the orthogonal direction in the light-receiving surface; and wherein the positive-phase signals of the two phases are a first signal and a second signal, and the negative-phase signal of the first signal is a third signal and the negative-phase signal of the second signal is a fourth signal, the element rows in the element row group are arranged along the direction orthogonal to the measurement direction in the order of: the positive-phase signal element row that outputs the first signal; the positive-phase signal element row that outputs the second signal; the negative-phase signal element row that outputs the third signal, and the negative-phase signal element row that outputs the fourth signal.

4. The optical encoder according to claim 2, wherein:

the light-receiving device converts the interference fringes received at the light-receiving surface into detection signals that vary in a corresponding manner to the period of the graduations in accordance with the relative movement between the scale and the detection head, and then outputs such detection signals, with the detection signals being differential signals of at least two phases with different phases;

the light-receiving surface includes an element row with multiple light-receiving elements arranged along the measurement direction with a period corresponding to that of the graduations, and an element row group where at least four such element rows are arranged together along a direction orthogonal to the measurement direction;

the element rows include for each of the two phases:

a positive-phase signal element row that outputs a positive-phase signal, and a negative-phase signal element row that outputs a negative-phase signal;

the at least two phases are staggered along the measurement direction with a predetermined phase difference; and the element rows in the element row group are arranged at positions where the sum of the distance in the orthogonal direction from a reference position to the positive-phase signal element row and the distance in the orthogonal direction from the reference position to the negative-phase signal element row, is equal for all phases of the at least two phases.

5. The optical encoder according to claim 4, wherein:

the element row group includes a first element row group and a second element row group, the second element row group being arranged adjacent to the first element row group in the orthogonal direction in the light-receiving surface, the second element row group including element rows in a different arrangement from that of the element rows in the first element row group;

the positive-phase signal element rows in the first element row group are half of the element rows in the first element row group, and are arranged on one side with respect to the center of the orthogonal direction in the first element row group, with the positive-phase signal element rows are arranged in an order that serves as a predetermined reference from one end side of the orthogonal direction toward the center in the first element row group;

the negative-phase signal element rows in the first element row group are half of the element rows in the first element row group, and are arranged on an other side with respect to the center of the orthogonal direction in the first element row group, the negative-phase signal element rows are arranged in an order that serves as a predetermined reference from the other end side of the orthogonal direction toward the center in the first element row group;

the positive-phase signal element rows in the second element row group are half of the element rows in the second element row group, and are arranged on one side with respect to the center of the orthogonal direction in the second element row group, with the positive-phase signal element rows being arranged in an order reverse to the order that serves as the predetermined reference from one end side of the orthogonal direction toward the center in the second element row group; and the negative-phase signal element rows in the second element row group are half of the element rows in the second element row group, and are arranged on the other side respect to the center of the orthogonal direction in the second element row group, the negative-phase signal element rows are arranged in an order reverse to the order that serves as the predetermined reference from the other end side of the orthogonal direction toward the center in the second element row group.

6. The optical encoder according to claim 1, wherein:
the light-receiving device includes:
a photodiode with an area greater than the total area of the total number of light-receiving elements, and
a pattern-forming layer arranged on a light-receiving surface of the photodiode, the pattern-forming layer including a transmissive part that transmits light therethrough and a non-transmissive part that blocks the light; and
wherein a plurality of such transmissive parts is formed along the measurement direction with the same period as that of the interference fringes, and the transmissive parts function as the light-receiving elements.

7. The optical encoder according to claim 1, wherein:
the detection head includes an optical element that concentrates light diffracted and divided by the scale toward the light-receiving surface; and
the optical element is disposed between the scale and the light-receiving device.

8. The optical encoder according to claim 7, wherein the optical element is a diffraction grating plate having a plate surface parallel to a surface of the scale on which the graduations are arranged and having a grating on the plate surface along a predetermined direction.

9. An optical encoder comprising: a plate-shaped scale having graduations formed along a measurement direction with a predetermined period, the graduations functioning as a diffraction grating for diffracting incident light; and a detection head provided, in a movable manner, relative to the scale along the measurement direction, wherein:
the detection head includes:
a light source that delivers light to the scale, and
a light-receiving device with a light-receiving surface for receiving the light from the light source via the scale;
wherein the light that has passed through the scale forms, on the light-receiving surface, interference fringes that vary in a corresponding manner to the predetermined period of the graduations in accordance with the relative movement between the scale and the detection head;
the light-receiving surface has an element row with multiple light-receiving elements arranged along the measurement direction with a same period as that of the interference fringes; and
wherein an error included in detection signals generated from the interference fringes obtained from the received light caused by an odd number of functional light-receiving elements is a number-of-elements-induced error, and wherein a predetermined allowable error is an allowable error,
wherein:
the scale diffracts and divides the light delivered from the light source into at least a 0-order light ray, ±1-order light rays, and ±2-order light rays;
the optical encoder takes the ±1-order light rays as signal light and the other light rays as unwanted light that causes the number-of-elements-induced error, and uses the interference fringes formed by the ±1-order light rays for detection;
the optical encoder is configured such that an intensity of the 0-order light ray is 50% or less than intensities of the ±1-order light rays delivered to the light-receiving device, and intensities of the ±2-order light rays are 14% or less than intensities of the ±1-order light rays delivered to the light-receiving device; and
wherein the allowable error is set to be 0.1%, the number of light-receiving elements in the element row is set to be 1,082 or more whereby the number-of-elements-induced error is 0.1% or less.

10. The optical encoder according to claim 9, wherein:
the light-receiving device converts the interference fringes received at the light-receiving surface into detection signals that vary in a corresponding manner to the period of the graduations in accordance with the relative movement between the scale and the detection head, and then outputs such detection signals, said detection signals being differential signals of at least two phases with different phases; and
the light-receiving surface includes a group of element rows where at least two element rows are arranged along a direction orthogonal to the measurement direction.

11. The optical encoder according to claim 10, wherein:
the light-receiving device converts the interference fringes received at the light-receiving surface into detection signals that vary in a corresponding manner to the period of the graduations in accordance with the relative movement between the scale and the detection head, and then outputs such detection signals, said detection signals being differential signals of two phases with different phases;
the light-receiving surface includes an element row with multiple light-receiving elements arranged along the measurement direction with a period corresponding to that of the graduations, and an element row group where four such element rows are arranged together along a direction orthogonal to the measurement direction;
the element rows include, for each of the two phases:
a positive-phase signal element row that outputs a positive-phase signal, which is one of the detection signals, and
a negative-phase signal element row that outputs a negative-phase signal, which is one of the detection signals;
the two phases are staggered along the measurement direction with a predetermined phase difference;
multiple element row groups are arranged along the orthogonal direction in the light-receiving surface; and
wherein the positive-phase signals of the two phases are a first signal and a second signal, and
the negative-phase signal of the first signal is a third signal and the negative-phase signal of the second signal is a fourth signal,
the element rows in the element row group are arranged along the direction orthogonal to the measurement direction in the order of: the positive-phase signal element row that outputs the first signal; the positive-phase signal element row that outputs the second signal; the negative-phase signal element row that outputs the third signal, and the negative-phase signal element row that outputs the fourth signal.

12. The optical encoder according to claim 10, wherein:
the light-receiving device converts the interference fringes received at the light-receiving surface into detection signals that vary in a corresponding manner to the period of the graduations in accordance with the relative movement between the scale and the detection head, and then outputs such detection signals, with the detection signals being differential signals of at least two phases with different phases;

the light-receiving surface includes an element row with multiple light-receiving elements arranged along the measurement direction with a period corresponding to that of the graduations, and an element row group where at least four such element rows are arranged together along a direction orthogonal to the measurement direction;

the element rows include for each of the two phases:

a positive-phase signal element row that outputs a positive-phase signal, and a negative-phase signal element row that outputs a negative-phase signal;

the at least two phases are staggered along the measurement direction with a predetermined phase difference; and the element rows in the element row group are arranged at positions where the sum of the distance in the orthogonal direction from a reference position to the positive-phase signal element row and the distance in the orthogonal direction from the reference position to the negative-phase signal element row, is equal for all phases of the at least two phases.

13. The optical encoder according to claim 12, wherein:

the element row group includes a first element row group and a second element row group, the second element row group being arranged adjacent to the first element row group in the orthogonal direction in the light-receiving surface, the second element row group including element rows in a different arrangement from that of the element rows in the first element row group;

the positive-phase signal element rows in the first element row group are half of the element rows in the first element row group, and are arranged on one side with respect to the center of the orthogonal direction in the first element row group, the positive-phase signal element rows are arranged in an order that serves as a predetermined reference from one end side of the orthogonal direction toward the center in the first element row group;

the negative-phase signal element rows in the first element row group are half of the element rows in the first element row group, and are arranged on an other side with respect to the center of the orthogonal direction in the first element row group, the negative-phase signal element rows are arranged in an order that serves as a predetermined reference from the other end side of the orthogonal direction toward the center in the first element row group;

the positive-phase signal element rows in the second element row group are half of the element rows in the second element row group, and are arranged on one side with respect to the center of the orthogonal direction in the second element row group, with the positive-phase signal element rows being arranged in an order reverse to the order that serves as the predetermined reference from one end side of the orthogonal direction toward the center in the second element row group; and the negative-phase signal element rows in the second element row group are half of the element rows in the second element row group, and are arranged on the other side with respect to the center of the orthogonal direction in the second element row group, the negative-phase signal element rows are arranged in an order reverse to the order that serves as the predetermined reference from the other end side of the orthogonal direction toward the center in the second element row group.

14. The optical encoder according to claim 9, wherein:

the light-receiving device includes:

a photodiode with an area greater than the total area of the total number of light-receiving elements, and a pattern-forming layer arranged on a light-receiving surface of the photodiode, the pattern-forming layer including a transmissive part that transmits light therethrough and a non-transmissive part that blocks the light; and wherein a plurality of such transmissive parts is formed along the measurement direction with the same period as that of the interference fringes, and the transmissive parts function as the light-receiving elements.

15. The optical encoder according to claim 9, wherein:

the detection head includes an optical element that concentrates light diffracted and divided by the scale toward the light-receiving surface; and the optical element is disposed between the scale and the light-receiving device.

16. The optical encoder according to claim 15, wherein the optical element is a diffraction grating plate having a plate surface parallel to a surface of the scale on which the graduations are arranged and having a grating on the plate surface along a predetermined direction.

* * * * *